United States Patent
Liu et al.

(10) Patent No.: US 9,215,082 B2
(45) Date of Patent: Dec. 15, 2015

(54) METHOD AND APPARATUS FOR HOP-BY-HOP RELIABLE MULTICAST IN WIRELESS NETWORKS

(75) Inventors: Hang Liu, Yardley, PA (US); Lijun Dong, North Brunswick, NJ (US)

(73) Assignee: THOMSON LICENSING, Issy-les Moulineaux (FR)

(*) Notice: Subject to any disclaimer, the term of this patent is extended or adjusted under 35 U.S.C. 154(b) by 61 days.

(21) Appl. No.: 13/499,412

(22) PCT Filed: Oct. 6, 2009

(86) PCT No.: PCT/US2009/005494
§ 371 (c)(1),
(2), (4) Date: Mar. 30, 2012

(87) PCT Pub. No.: WO2011/043755
PCT Pub. Date: Apr. 14, 2011

(65) Prior Publication Data
US 2012/0182860 A1    Jul. 19, 2012

(51) Int. Cl.
| | | |
|---|---|---|
| H04W 24/04 | (2009.01) | |
| H04L 12/18 | (2006.01) | |
| H04L 12/721 | (2013.01) | |
| H04L 1/00 | (2006.01) | |
| H04L 12/701 | (2013.01) | |
| H04L 12/703 | (2013.01) | |

(Continued)

(52) U.S. Cl.
CPC ........ *H04L 12/1863* (2013.01); *H04B 7/15521* (2013.01); *H04L 1/0041* (2013.01); *H04L 45/00* (2013.01); *H04L 45/123* (2013.01); *H04L 45/24* (2013.01); *H04L 45/28* (2013.01); *H04L 47/12* (2013.01); *H04W 40/02* (2013.01); *H04W 84/18* (2013.01); *H04L 45/38* (2013.01); *H04L 47/10* (2013.01)

(58) Field of Classification Search
CPC ....... H04L 1/004; H04L 45/02; H04L 45/123; H04L 45/28; H04L 41/12; H04L 1/1607; H04L 41/0816; H04L 41/083; H04L 2001/0093; H04L 41/5022
USPC .................................................. 370/216, 312
See application file for complete search history.

(56) References Cited

U.S. PATENT DOCUMENTS

2006/0018253 A1* 1/2006 Windisch et al. ............. 370/216
2007/0019646 A1   1/2007 Bryant (Continued)

OTHER PUBLICATIONS

Koutsonikolas etal; "High-Throughput, Reliable Multicast without "Crying Babies" in Wireless Mesh Networks", Poster, 4th ACM SIGCOMM Int'l Conf. Dec. 9, 2008.

(Continued)

*Primary Examiner* — Jae Y Lee
*Assistant Examiner* — Jean F Voltaire
(74) *Attorney, Agent, or Firm* — Robert D. Shedd; Catherine A. Cooper

(57) ABSTRACT

A method and apparatus are described including performing hop-by-hop multicasting including network coding of data packets of a portion of content, wherein network coding further includes encoding data packets of a portion of content, multicasting said network coded data packets to downstream receivers, determining if an acknowledgement message has been received from at least one of the downstream receivers, determining if acknowledgement messages have been received from all of the downstream receivers responsive to the first determination.

21 Claims, 14 Drawing Sheets

(51) Int. Cl.
*H04W 84/18* (2009.01)
*H04W 40/02* (2009.01)
*H04B 7/155* (2006.01)
*H04L 12/707* (2013.01)
*H04L 12/801* (2013.01)

(56) References Cited

U.S. PATENT DOCUMENTS

| 2007/0177525 | A1  | 8/2007 | Wijnands |
| 2008/0089333 | A1* | 4/2008 | Kozat et al. ................. 370/390 |
| 2008/0137585 | A1* | 6/2008 | Loyola et al. ............... 370/315 |
| 2009/0003216 | A1* | 1/2009 | Radunovic et al. .......... 370/237 |
| 2009/0086666 | A1* | 4/2009 | Guvenc et al. .............. 370/328 |
| 2009/0213854 | A1* | 8/2009 | Menendez et al. ........... 370/390 |
| 2010/0195488 | A1* | 8/2010 | Mehrotra et al. ............ 370/216 |
| 2010/0214970 | A1* | 8/2010 | Brunner et al. ............. 370/312 |
| 2010/0272208 | A1  | 10/2010 | Feigin et al. |

OTHER PUBLICATIONS

T. Ho etal; "Network Coding: An algorithmic perspective" DIMACS Tutorial on Algorithms for Next Generation Networks. Aug. 13, 2007, pp. 1-92.
Search report dated Jul. 15, 2010.

* cited by examiner

Eight PHY modes of the IEEE 802.11a radio

| Mode | Modulation | Code Rate | Data Rate |
|------|------------|-----------|-----------|
| 1 | BPSK | 1/2 | 6 Mbps |
| 2 | BPSK | 3/4 | 9 Mbps |
| 3 | QPSK | 1/2 | 12 Mbps |
| 4 | QPSK | 3/4 | 18 Mbps |
| 5 | 16-QAM | 1/2 | 24 Mbps |
| 6 | 16-QAM | 3/4 | 36 Mbps |
| 7 | 64-QAM | 2/3 | 48 Mbps |
| 8 | 64-QAM | 3/4 | 54 Mbps |

Fig. 4

Chunk ack table and round-robin transmission list update algorithm at forwarding node N

*if* node N receives an ACK for Chunk i from Child m {
      N update its chunk ack table
      *if* N has received ACKs for Chunk i from all its children {
           N removes Chunk i from its round-robin transmission list
      }
}
*if* node N has received at least one ACK for Chunk i from its children && has received
   Chunk i+1 && Chunk i+1 is not in its round-robin transmission list {
      N adds Chunk i+1 to the round-robin transmission list
}

Fig. 6

METHOD AND APPARATUS FOR HOP-BY-HOP RELIABLE MULTICAST IN WIRELESS NETWORKS

This application claims the benefit, under 35 U.S.C. §365 of International Application PCT/US2009/005494, filed Oct. 6, 2009, which was published in accordance with PCT Article 21(2) on Apr. 14, 2011 in English.

FIELD OF THE INVENTION

The present invention relates to wireless networks in general and, in particular, to hop-by-hop multicast in wireless networks.

BACKGROUND OF THE INVENTION

In multicast and/or broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

Data is usually formatted into packets and or frames for transmission. That is, packets and frames are data formatting schemes. As used herein data can be formatted into any convenient format for transmission including packets and/or frames.

Multicast applications such as content distribution, file sharing, data casting, software upgrade, and video multicast are becoming increasingly common. In contrast to unicast, high-throughput reliable multicast in wireless mesh networks (WMNs) has received little attention. Reliable multicast, i.e. the distribution and delivery of data to multiple receivers, in wireless multi-hop networks is very important because it provides many applications to wireless clients (devices, stations, nodes), such as video sharing, content distribution, file download, interactive chat lines, software upgrade, etc. A 100% Packet Delivery Ratio is always in conflict with high throughput in conventional multicast protocols. Multicast data packets are transmitted along different paths with various hops and throughput from the multicast source to different multicast receivers, i.e. the paths from the multicast source to different receivers have various quality characteristics, packet loss rates and throughput. Due to the lossy nature of wireless links, varying channel conditions and interference, reliable multicast is difficult to achieve in multi-hop networks. Another challenge is the "crying babies" problem, which is the notion that a few receivers with particularly bad connections may experience a high packet loss and low throughput. This results in slowing down the whole multicast session in order to ensure that these "crying babies" receive the data transmission. It is thus challenging to achieve reliable and efficient multicast with no loss and high throughput over multi-hop wireless networks because the receivers ("crying babies") with poor network connectivity and lossy wireless links may greatly degrade the performance of the receivers with good network connectivity.

Traditional reliable multicast techniques are all client and server based. There is no intermediate node interaction. That is, intermediate nodes and/or routers simply forward the data packets. One class of reliable multicast schemes is based on Forward Error Correction (FEC). With FEC, the sender (transmitter, source) transmits (sends, forwards) redundant encoded data packets, and the receivers (sinks, destinations) detect and recover lost data packets in order to reconstruct the original data. No feedback from the receivers and no retransmissions are required. The use of FEC itself cannot guarantee 100% reliability. While the most common form of FEC usually involves Reed-Solomon (RS) codes, at least one FEC scheme for reliable multicast uses a linear code (such as Digital Fountain codes). "In Coding Theory and Communication Theory, fountain codes (also known as rateless erasure codes) are a class of erasure codes with the property that a potentially limitless sequence of encoding symbols can be generated from a given set of source symbols such that the original source symbols can be recovered from any subset of the encoding symbols of size equal to or only slightly larger than the number of source symbols." (Wikipedia) In such a scheme, the server keeps sending coded data packets for a chunk (unit) of data to multiple receivers and a multicast receiver receives the coded data packets. The receiver leaves (exits) the multicast tree after receiving enough data packets to decode the data (content). The issue is that the server needs to keep transmitting (sending) the data packets for the chunk until the last receiver receives enough data packets to decode the transmission even if only one link is the bottleneck. This is a waste of bandwidth.

Another prior art scheme is based on hybrid ARQ-FEC. A negative acknowledgement (NACK) is often used to reduce the feedback traffic. Receivers send NACKs to the server to request lost or damaged data packets in order to recover the lost or damaged data packets. The term "corrupted data packets" is used herein to include any data packets that have been lost, destroyed or damaged in any way. The server retransmits the FEC coded packets in multicast. Receivers recover their lost data packets using FEC. It is possible that each receiver may have different lost packets that can all be recovered using the same FEC data. However, it may cause a problem known as NACK implosion and delay will be incurred due to the NACK transmissions resulting in delays for the server transmitting and the receivers receiving the FEC data.

It has been shown recently that network coding can increase throughput over a broadcast medium, such as that in wireless networks, by allowing intermediate nodes (routers) to encode data packets instead of simply replicating and forwarding data packets. An intermediate node can mix data packets from different flows into a coded data packet to increase the information content in a transmission and the receivers can decode the original data packets using the coded data packets and the data packets overheard earlier. This is called inter-flow network coding. Inter-flow network coding requires special network topology and flow routes such as "Alice-Bob structure" or X-structure" in order for the receivers to overhear the data packets of different flows and decode the coded data packets. Furthermore, inter-flow network coding requires the transmitter to know what data packets have been overheard or buffered by each of the receivers. These requirements result in certain application limitations of inter-flow network coding and control overhead. More recently, intra-flow network coding based on random linear block codes has attracted some research attention, in which a network router (source and intermediate node) performs random linear coding operations to a block of data packets of a flow, i.e. independently and randomly select linear mappings from inputs onto output over some field, and sends the coded data packets. The primary goal is to bring new information to the receivers in each of the forwarded data packets.

Network coding allows the source and every intermediate node to perform coding operations on data packets it has besides simply replicating and forwarding the data packets. Before the operation, the node usually determines if a received packet is innovative or not before it is added to the linear combination. A packet is said to be innovative if it is linearly independent with respect to other packets by Gaussian elimination. In the other words, the packet brings new information to the node. A receiver can decode the original data as long as it receives or overhears enough innovative data packets from any node (ancestor nodes (parents, grandparents, . . . ) and sibling nodes) along any path (route, link, channel). That is, if the receiver receives as many independent linear combinations as is necessary to reach the full rank of data in the chunk the source has. The full rank equals the number of original packets the source intended to transmit to the receivers. Initial theoretical work in information theory has shown that distributed random linear network coding achieves multicast capacity with probability exponentially approaching 1 with the code length, as well as taking advantage of redundant network capacity for improved success probability and robustness, in general multicast networks. Furthermore, the broadcast medium in wireless networks allows overhearing and opportunistic routing, leading to further performance and protocol design advantages.

Practical design that employs network coding (NC) to ensure reliable multicast in wireless mesh networks is still in the initial stages of research and development. Wireless mesh networks incur lossy and varying channel conditions and interference. That is, some receivers have good wireless connections to the multicast source, but some other receivers have very lossy and low throughput paths to the multicast source. There are many issues surrounding the protocol design with or adaptation to network coding for distributed network resource optimization. In the prior art, a scheme called MORE was the first practical RNC based protocol. MORE uses intra-flow RNC with opportunistic routing. Conventional routing chooses the next-hop before transmitting a data packet but, when link quality is poor, the probability that the chosen next-hop receives the data packet correctly is low. In contrast, opportunistic routing allows any node that overhears the transmission and is closer to the destination to participate in forwarding the data packet to the destination, increasing the throughput. This is called opportunistic routing or opportunistic forwarding or opportunistic delivery. In MORE, any node that overhears the transmission and is closer to the destination can participate in forwarding the data packet to the destination, forming a forwarding belt instead of path. However, multiple nodes may hear a data packet broadcast and unnecessarily forward the same data packet. Belt forwarding can be inefficient, especially for multicast in which multiple overlapped belts are formed. Conventional opportunistic routing protocol, for example, ExOR deals with this issue by imposing a strict media access control (MAC) scheduler on routers' access to the medium, which prevents spatial reuses and makes the protocol less amenable to extensions to alternate traffic types such as multicast although the scheduler delivers opportunistic gains. Instead, to reduce duplicate packets over the air, MORE combines RNC with opportunistic routing with the primary goal of removing the strict MAC scheduling coordination of forwarding routers required in opportunistic routing. MORE randomly mixes packets before forwarding them. This randomness ensures that routers that hear the same transmission do not forward the same data packets. MORE addresses both unicast and multicast routing. However in MORE, multiple intermediate nodes that hear the data packet broadcast forward the coded data packets opportunistically without any coordination. The number of coded data packets sent by an intermediate node may be more than that needed so bandwidth is wasted, or less than that needed so extra delay is introduced for the receiver to receive enough data packets to decode the original data. In addition, MORE lacks source rate limiting which can cause congestion. Furthermore, it suffers from the "crying babies" problem which is unique to multicast.

Pacifer is a state-of-the-art reliable multicast protocol for wireless mesh networks. Pacifer improves upon MORE by using conventional tree-based multicast routing with intra-flow network coding and opportunistic routing (forwarding, delivery). In Pacifer, only the nodes on the multicast tree can perform random linear network coding of incoming data packets and forward the coded data packets along the tree. Pacifer has been proved to be more efficient than MORE. However, similar to MORE, the intermediate nodes do not cooperate with each other and do not send feedback (acknowledgement) of data packet receipt status to their parent nodes. Each node simply estimates the number of coded data packets to transmit to its children (child nodes) per received data packet assuming the expected link loss rate is known. This approach may still result in sending more data packets unnecessarily or less data packets insufficiently. Pacifer also does not consider the impact of physical layer multi-rate to the throughput and link loss rate since Pacifer only deals with the expected data packet loss rate. In Pacifer, a file is divided into batches, e.g. a batch includes 32 data packets. The source iteratively sends the batches in a round-robin manner to deal with the "crying baby" problem. The source switches to the next batch when it receives from one receiver an acknowledgement of completion (complete reception) of the current batch or it transmits the number of coded data packets of this batch more than an estimated limit (counter) value. This approach reduces the "crying baby" problem, but it introduces a set of issues in real situations. Acknowledgements might get lost or delayed due to heavy congestion. The best receiver might not receive the whole batch due to data packet loss when the number of transmitted data packets has reached the limit and the source switches to the next batch. The authors realized this issue, and introduced a tunable knob to set a proper limit (counter) value. However, this tunable knob or the limit (counter) value is hard to estimate, leading to either wasting bandwidth or additional delay. Another issue is that the source switches to the next batch once the source receives an acknowledgement from the best receiver. Other receivers must wait for a whole round before the source transmits data packets from the first batch again. This results in long delays and unfairness for other receivers. If the acknowledgements for the two batches are from two different receivers, the situation becomes even worse and no receiver can quickly obtain the necessary number of data packets to decode all the batches in order and complete the file downloading or content retrieval quickly.

As multicast is becoming increasingly common with content distribution and file sharing applications, new solutions for throughput improvement and better handling of the "crying babies" problem are needed to support these multicast applications in reliable and high-performance ways over multi-hop wireless mesh networks. With dramatic advances in micro-processor and data storage technologies, modern wireless routers are equipped with much more powerful processing capability and data storage capacity at significantly lower prices than even a couple of years ago. Tradeoffs can be made in protocol design for processing power and storage capacity requirements, and bandwidth efficiency performance.

SUMMARY OF THE INVENTION

The present invention is directed to a reliable multicast method, called HopCaster herein. HopCaster exploits the ever increasing processing power and storage capability in modern wireless routers to achieve efficient and reliable multicast transport services to end devices (clients, nodes, stations, ... ) that may be wired or wireless, static, mobile, and/or intermittently disconnected and either resource rich or resource poor. A wireless network is used as an exemplary embodiment herein. HopCaster utilizes feedback from intermediate nodes. As used herein, the term "router" includes routers, switches, bridges and brouters. The present invention incorporates the following elements (1) reliable hop-by-hop multicast with in-network store-and-forward transport (transmission) along a multicast distribution tree; (2) intra-flow (intra-stream) network coding enabling effective opportunistic routing (forwarding, delivery); (3) local throughput optimization to adapt to optimal radio physical layer transmission mode based on a varying topology of children at different stages of a multicast transmission; (4) adaptive packet scheduling to solve the network connection heterogeneity problem of the receivers ("crying baby", heterogeneous receiver, receiver heterogeneity problem) in multicast; and (5) explicit congestion control to utilize the distributed caching capability of intermediate routers in the network for efficient reliable multicast.

A method and apparatus are described including performing hop-by-hop multicasting including network coding of data packets of a portion of content, wherein network coding further includes encoding data packets of a portion of content, multicasting said network coded data packets to downstream receivers, determining if an acknowledgement message has been received from at least one of the downstream receivers, determining if acknowledgement messages have been received from all of the downstream receivers responsive to the first determination.

BRIEF DESCRIPTION OF THE DRAWINGS

The present invention is best understood from the following detailed description when read in conjunction with the accompanying drawings. The drawings include the following figures briefly described below:

FIG. 4 shows the physical layer modes with corresponding modulation and channel coding schemes for an exemplary wireless interface.

FIG. 6 is an exemplary embodiment of a method for the chunk transmission scheduling and chunk acknowledgement table update method in accordance with the principles of the present invention.

DETAILED DESCRIPTION OF THE PREFERRED EMBODIMENTS

Figure 1:
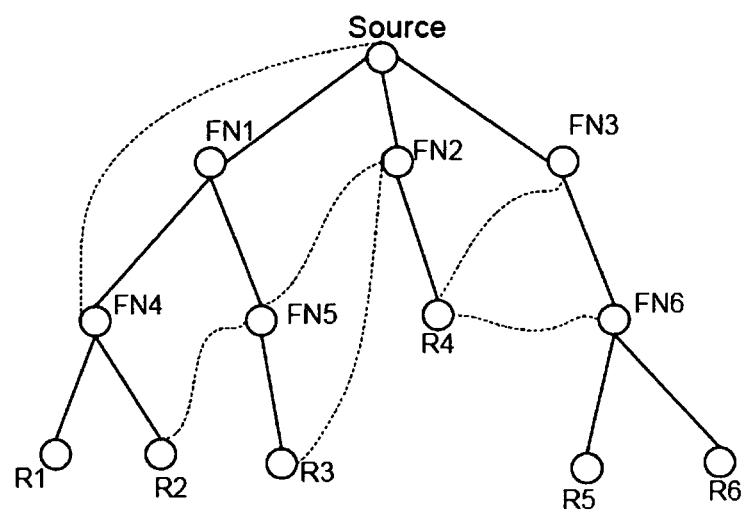
FIG. 1 shows an exemplary wireless network.

HopCaster exploits the ever increasing processing power and storage capability in modern wireless routers and utilizes efficient feedback from intermediate nodes for efficient and reliable multicast transport. It has several key components, which provide reliable hop-by-hop multicast with in-network store-and-forward transport along a multicast distribution tree, intra-flow (intra-stream) network coding enabling effective opportunistic forwarding (routing, delivery), local throughput optimization to adapt to optimal physical layer transmission mode based on a varying topology of children at different stages of a multicast transmission, explicit congestion control to utilize the distributed caching capability of intermediate routers in the network for efficient reliable multicast, adaptive packet scheduling to solve "crying babies" problem in multicast.

In HopCaster, a multicast tree is built connecting the source (as the root node) to all receivers as in Pacifier. However, in Pacifier, the expected transmission count (ETX), i.e. the expected packet loss probability, is used as the link metric to establish the multicast tree. ETX only considers the packet loss probabilities of the links, but not the link's bandwidths and the impact of radio's multi-rate transmission capability. The present invention uses expected transmission time (ETT) as the link metric to construct the shortest path tree connecting the source to all the receivers. The tree rooted at the source and includes all the shortest-ETT paths from the source to the receivers. The multicast tree is reconstructed when the network topology changes, that is whenever connectivity between the source and any of downstream nodes on the multicast tree changes or some node completes sending or receiving a chunk of data packets or a node joins or leaves (exits) the multicast tree.

The ETT for a link L is defined as the expected time for successfully transmitting a data packet over the link and reflects the amount of channel resources consumed by transmitting the data packet over the link. It can be formulated as $ETT_L = s/r_L (1/(1-e_L))$, where $e_L$ is the data packet loss rate, $r_L$ is the transmission rate of link L, s is the standard test data packet size (e.g. 1000 bytes). The cost of a path is the summation of the ETT's of all the links along the path. The ETT metric captures the impact of both data packet loss probability and link bandwidth on the performance. Put another way, the ETT (airtime) for each link can be calculated as:

$$ETT = \left(O + \frac{B_t}{r}\right)\frac{1}{1 - e_f} \quad (1)$$

The value of O depends on PHY and MAC channel access overhead, which includes frame headers, training sequences, access protocol frames, etc. Given a MAC and PHY protocol, O is a constant. $B_t$ is number of bits in test frame. The input parameters r and $e_f$ are the data rate in Mbps and the frame (packet) error (loss) rate for the test frame of size $B_t$ respectively. The rate r represents the data rate at which the mesh router would transmit a frame of standard size $B_t$ based on current link conditions. The frame error rate $e_f$ is the probability that when a frame of standard size $B_t$ is transmitted at the current transmission bit rate r, the frame is corrupted due to transmission error(s). Their estimation depends on the local implementation. Frames that are dropped due to exceeding their time to live (TTL) should not be included in this estimate as they are not correlated with link performance.

The source and intermediate forwarding nodes (FNs) in HopCaster use intra-flow network coding (NC). Random linear block codes (random linear network coding) are used as an example to explain the invention. Other codes such as erasure codes, fountain codes can be used as intra-flow network coding in the present invention. A large file can be divided into multiple chunks (batches, clips, segments) at the source before distribution to reduce initial decoding delay at the receiver, packet header overhead, and processing and buffering requirements at the intermediate forwarding nodes. For each chunk, the source sends random linear combinations of the data packets belonging to that chunk.

Suppose the file is divided into W batches or chunks that the source is going to disseminate among D receivers. For example, each batch (chunk) has 32 data packets. Each batch (chunk, clip, segment) has a finite $B_k$ number of native (uncoded, original) data packets, $A_k = \{a_{k1}, a_{k2}, \ldots, a_{kBk}\}$. Therefore, there are $$B = \sum_{k=1}^{W} B_k$$

original packets to be multicast. A random linear coding is performed at the source node for each chunk (batch). Take the $k^{th}$ batch (chunk) for example, $$x_{kj} = \sum_{i=1}^{B_k} \alpha_{ij} a_{ki} \quad (2)$$

where α is coding coefficient from a finite field, $F_q$ of size q. Typically, $F_{2^8}$, e.g. $F_{256}$ is used.

Referring to FIG. 1, which is a schematic diagram of an exemplary wireless network. A multi-hop wireless mesh network (WMN) usually includes mesh routers (mesh access points (MAPs), forwarding nodes), gateways and client stations (receivers, hosts). Mesh routers (mesh access points, forwarding nodes) form a multi-hop wireless infrastructure. One or more mesh router (MAP) may be connected to the wired Internet acting as the mesh gateway. Client stations without mesh functions such as laptops, smart phones, etc., do not participate in the packet relay, but associate with a mesh router (MAP) to obtain network access. The mesh routers forward traffic for the client stations in the mesh. Most of the traffic in a mesh network is normally either forwarded from or to a gateway. Mesh routers are often immobile and not constrained in terms of resources. The content (file, data, . . . ) comes from the source (which may be a gateway and may have received the content from outside of this exemplary wireless network or may be a server in the mesh network and have the content to send), which is the root node of this multicast tree (group). The nodes labeled as FN1, . . . , FN6 are forwarding node (router, MAP) and are also called intermediate nodes and routers herein. The nodes labeled R1, . . . , R6 are the leaf nodes of the multicast tree. The leaf nodes may be end devices (receivers, hosts, client stations, sinks, destinations, . . . ) of the content. The end devices may be (but are not limited to) clients, client devices, mobile devices, mobile terminals, computers, laptops, notebooks, personal digital assistants (PDA) or dual mode smart phones. The leaf nodes may also be proxies (routers, portals) that connect to (communicate with) other networks or end devices (destinations) (not shown in the figure). Furthermore, a node (device) may be both an end device (receiver, destination) and a forwarding node (router). A node (device) may be both a proxy (portal) and a forwarding node (router). A node (device) may be an end device (receiver, destination) and a proxy (portal) and a forwarding node (router). That is, a forwarding node may also be a proxy for other devices (networks) and/or an end device (receiver, final destination) of the multicast content. A multicast group member can be a leaf node or a forwarding node on the multicast tree. Due to the broadcast nature of the wireless medium, a node (leaf node or forwarding node) can receive the data packets from its direct parent on the tree, as well as have opportunities to overhear the packets from other neighboring nodes (grandparents, sibling nodes . . . ). The solid lines in FIG. 1 represent the links on the multicast tree and the dashed lines represents that a node can overhear the packet transmissions from its neighbors.

A data packet $x_{kj}$ is innovative to a node when the rank of chunk k increases by 1 after receiving it. Intermediate forwarding nodes (FNs) cache all innovative data packets of the chunk and also perform intra-flow networkcoding on the innovative data packets of the chunk before forwarding the re-encoded innovative data packets. As an example, random linear block codes (random linear network coding) are used to explain the invention. Other codes such as erasure codes, fountain codes can be used as intra-flow network coding in the present invention. Each encoded data packet carries the batch (chunk) identifier (ID) and its coding vector, i.e. the vector of the random coefficients used to generate that data packet, in the header. Still using chunk k as an example, in FIG. 1, for example, FN1 receives $B_k$ innovative data packets of the first chunk from the source, $X_k = \{x_{k1}, x_{k2}, \ldots, x_{kBk}\}$. It is obvious that the linear combinations of the $X_k$ set at FN1 are still linear combinations of the un-coded original data packets of chunk k. As long as the rank of received data packets reaches $B_k$, a node is able to decode the received data packets to obtain the original data packets of chunk k. Due to the broadcast nature of the wireless medium, there are many opportunities for a node to overhear data packets from their neighbors (neighboring nodes), although the data packets might not come from their direct ancestors (parent nodes) along the multicast tree. In FIG. 1, the dashed lines show the possible pairs which can overhear each other's packets. They are geographically near one another but do not have parent-child relationship. Because each forwarding node performs random linear network coding on the input data packets before forwarding them, the probability that a node receives duplicate packets from their neighboring nodes is reduced. The FNs performing random linear coding can check and ensure that the forwarded data packet is innovative from the data packets it has already received.

Different from Pacifier and MORE, data transport in Hop-Caster operates in a hop-by-hop store-and-forward manner with large-sized data units (chunks, batches, clips, segments). Hop-by-hop store-and-forward transport means that a forwarding node (FN) caches all the innovative data packets of a chunk and sends an acknowledgement to its parent once it successfully receives the full rank of the current batch. Note that a node receives data packets not only from its parent on the multicast tree, but also overhears data packets from its other neighboring nodes such as grandparent nodes and sibling nodes due to broadcast nature of wireless medium. Once all the children (child nodes) acknowledge the successful reception of a chunk, the parent completes the transmission of this chunk and moves to the next chunk. The children (child nodes) are responsible for delivering this chunk to their children (child nodes). Furthermore, if an intermediate forwarding node receives a data packet for the chunk from its parent node that it has completely cached, that FN sends an acknowledgement message to its parent node. When a receiver (destination) receives the full rank of linearly independent coded data packets of a chunk, the receiver (destination) decodes the chunk to obtain the original data packets. The receiver (destination) then sends an acknowledgement to its parent node.

A forwarding node may remove a completed chunk from its cache if the storage is needed for other purposes after the forwarding node completes the delivery of this chunk to all its children (child nodes). Or the forwarding node may keep the cached chunks in its storage. The cached copies may be needed during network topology changes or for new receivers (destinations) as described below. Note that the source will continue data multicast in a multicast group with certain scheduling as long as there are members in the multicast group. The chunk scheduling algorithms are also discussed below.

In one embodiment of the present invention, a FN does not begin sending the coded data packets of a chunk to its children (child nodes) until it receives the full rank of the chunk and sends the acknowledgement to its parent node. This approach reduces the channel contention among transmissions of the same chunk if the multi-hop transmissions share the same channel. It also reduces the probability that the forwarded data packet is not innovative from the data packets sent by its parent node since the FN performing random linear coding will ensure that the forwarded data packet is innovative from all its already received data packets. However, this approach causes extra buffering delay. In an alternative approach, a FN can start performing the linear combination and sending the coded data packets of a chunk to its children as soon as it receives two or more innovative data packets of a chunk if transmission of previous chunks has been completed or depending on certain packet scheduling. The scheduling algorithm will be described below. This approach better utilizes the benefits of pipelining and reduces delay.

This hop-by-hop transport and acknowledgement strategy offers several advantages compared to the end-to-end acknowledgement used in Pacifier and MORE. The hop-by-hop transport and acknowledgement push the content (data, chunks, batches, clips, segments) close to the receivers (destinations) using available bandwidth more efficiently. It handles network heterogeneity better. Consider a "crying baby" receiver (destination) with a bottleneck link close to the receiver (destination). If the end-to-end acknowledgement mechanism is used, the source will keep transmitting the data packets until an end-to-end acknowledgement of successful reception of the chunk from the worst receiver (destination) ("crying baby") is received. The bandwidth is wasted on the non-bottleneck links. Alternatively, hop-by-hop transmission and acknowledgement avoids this deficiency, since the FN at the upstream of the bottleneck link will cache the data and informs of its parent node to stop sending unnecessary data packets. Furthermore, with hop-by-hop acknowledgement, the source and FNs do not need to estimate the expected number of extra coded data packets to transmit per chunk to compensate for potential packet transmission loss as did Pacifier and MORE. It is difficult to make accurate estimations of the number of lost packets over varying wireless channels with fading and interference. Any overestimation causes bandwidth waste and any underestimation causes delay.

The advantages of hop-by-hop transport and acknowledgement are even more pronounced when the network becomes congested or network nodes are mobile. End-to-end acknowledgement may be delayed under heavy congestion. The source continues sending packets before receiving the acknowledgement, leading to bandwidth waste. Such deficiency was recognized by the authors of Pacifier. The authors proposed to solve the problem by estimating the extra data packets to be transmitted per chunk based on expected data packet loss rate and only transmitting the estimated number of extra packets before switching to next chunk. As described above, inaccurate estimation of data packet loss rate results in bandwidth deficiency or extra delay receiving a chunk. The hop-by-hop acknowledgement avoids the uncertainty in this guessing game of the data packet loss rate and represents a solution to the problem of delayed end-to-end acknowledgement. Even for a single destination, the end-to-end connection over a path of n hops would break or deteriorate as soon as any link in the path failed or degraded, triggering route repair or route re-discovery mechanisms. The rate of mobility-induced disconnection or degradation on the n hop path would be roughly n times that of a single hop. The situation is worsened in multicast since more receivers and forwarding nodes are involved. Thus, a single hop transfer is far more reliable. The hop-by-hop catch-and-forward approach combines reliable single hop forwarding with delivery from intermediate cache. This combination will offer faster and more efficient transport in multi-hop mesh networks as described below.

Current radios offer multi-rate capability to adapt to channel conditions at a per-packet granularity. The hop-by-hop transport and acknowledgement allows local optimization of radio transmission mode. The above observation motivates the hop-by-hop catch-and-forward multicast transport design of HopCaster.

Specifically, based on this hop-by-hop acknowledgement scheme, each node on the multicast tree may keep a chunk acknowledgement (ACK) table shown in Table 1. At start-up, except the source node, the chunk ACK table is empty in other nodes since the transmission has not started from the source. Obviously, however, every parent node knows the list of its children through multicast tree construction. The chunk ACK table contains the information for which chunks the node has full-rank data packets and whether an acknowledgement message has been received from a child node for a particular chunk. As an example in Table 1, it can be seen that the node has completely received $B_1$ innovative data packets out of $B_1$ total packets for chunk 1, and $B_2$ innovative data packets out of $B_2$ total packets for chunk 2, both of which reaches full rank. It has not completed the reception of chunk 3. Meanwhile the node receives acknowledgement for chunk 1 from all of its child nodes. But for chunk 2, it receives acknowledgement only from $Child_1$. In the case of the source node, it owns (has stored in its cache (storage)) all W chunks. Thus, there are W rows in its acknowledgement table.

TABLE 1

Chunk acknowledgement (ACK) table

| Chunk | Number of received packets/ total number of packets | Child 1 | Child 2 | Child 3 |
|---|---|---|---|---|
| 1 | $B_1/B_1$ | Acked | Acked | Acked |
| 2 | $B_2/B_2$ | Acked | Not Acked | Not Acked |
| 3 | $4/B_3$ | Not Acked | Not Acked | Not Acked |

Figure 2A:
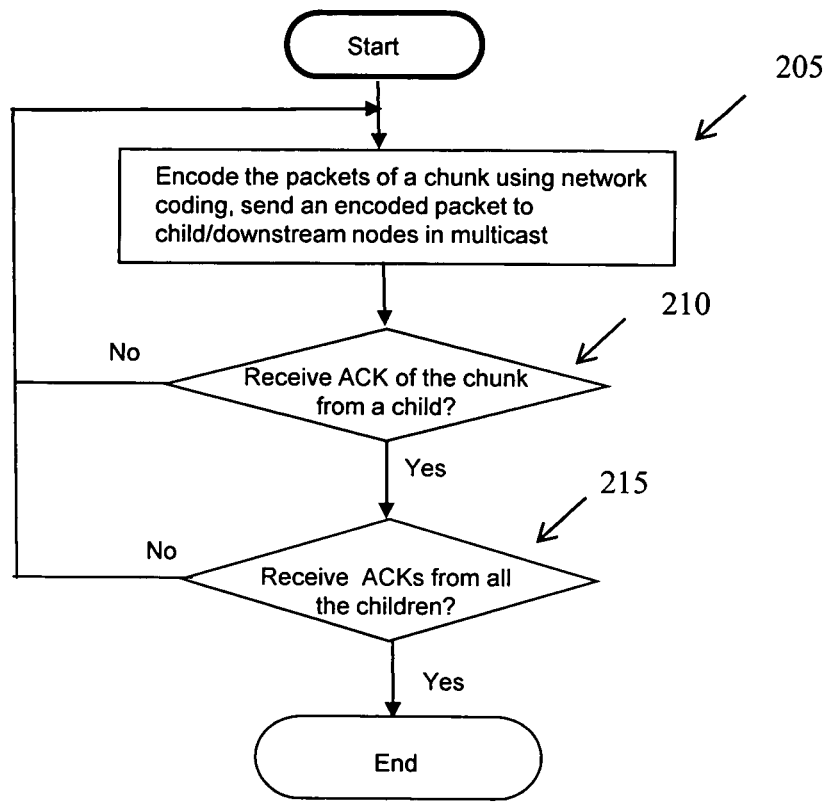
FIG. 2A is a flowchart for an exemplary transmitting method of a source node of the hop-by-hop multicast in accordance with the principles of the present invention.

FIG. 2A is a flowchart for an exemplary transmitting method of a source node of the hop-by-hop multicast in accordance with the principles of the present invention. At 205 the source node encodes the data packets of a chunk of content (data) using network coding and sends (forwards, transmits) an encoded data packet to its child (downstream) nodes in multicast. At 210 the source node determines if it has received an acknowledgment message for the chunk of content (data) from a child node. If the source node has not received an acknowledgment message for the chunk of content (data) from a child node then processing returns to 205. If the source node has received an acknowledgment message (ACK) for the chunk of content (data) from a child node then at 215, the source node determines if it has received an acknowledgment message for the chunk of content (data) from all of its child nodes (children). If the source node has not received an acknowledgment message for the chunk of content (data) from all of its child nodes (children) then processing returns to 205. If the source node has received an acknowledgment message for the chunk of content (data) from all of its child nodes (children) then processing ends.

Figure 2B:
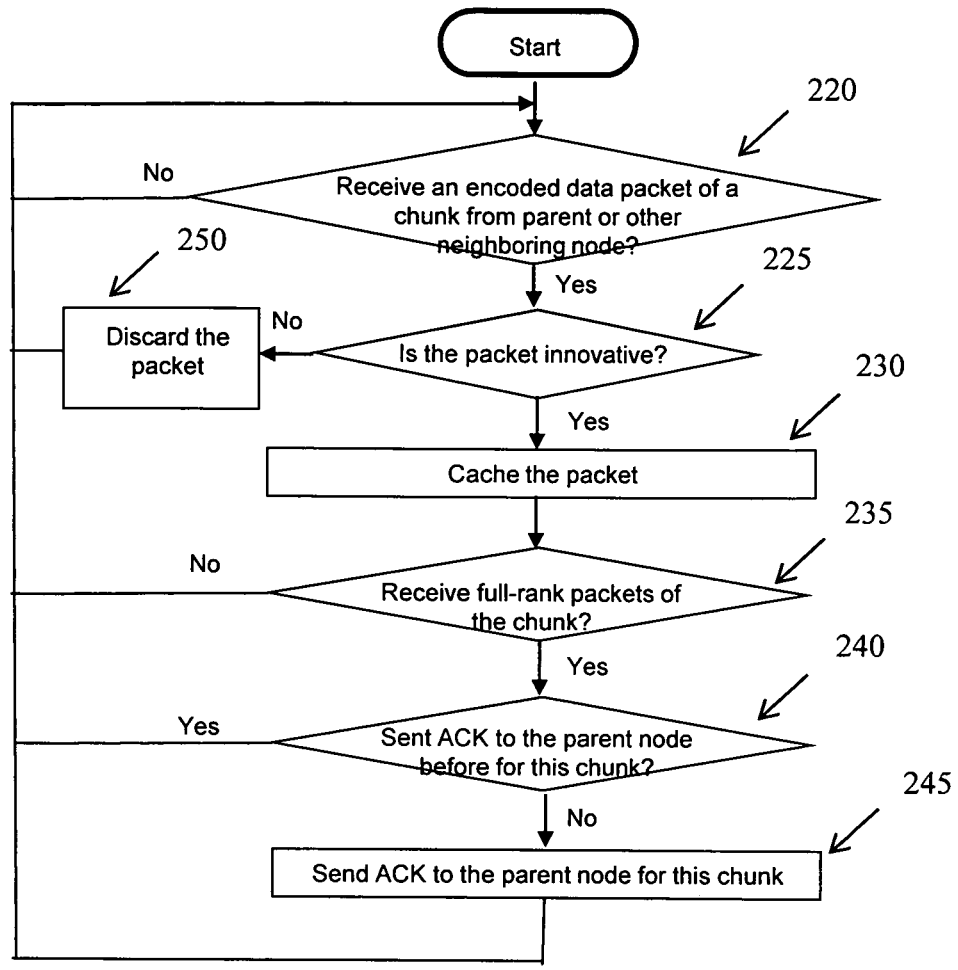
FIG. 2B is a flowchart for an exemplary receiving method of a forwarding node or receiver of the hop-by-hop multicast method in accordance with the principles of the present invention.

FIG. 2B is a flowchart for an exemplary receiving method of a forwarding (intermediate) node or a receiver (destination) node of the hop-by-hop multicast method in accordance with the principles of the present invention. A forwarding (intermediate) node or a receiver (destination) node is called a node, unless it is otherwise noted. At 220, the node determines if it has received an encoded data packet of a chunk of content (data) from a parent node or other neighboring node. If the node determines that it has not received an encoded data packet of a chunk of content (data) from a parent node or other neighboring node then processing continues at 220. If the node determines that it has received an encoded data packet of a chunk of content (data) from a parent node or other neighboring node then at 225 the node determines if the received encoded data packet is innovative. If the received encoded data packet is not innovative then at 250 the received encoded data packet is discarded. If received encoded data packet is innovative then at 230 the received encoded data packet is cached (stored). At 235 the node determines if it has received a full rank of encoded data packets for this chunk of content (data). If the node has not received a full rank of encoded data packets for this chunk of content (data) then processing returns to 220. If the node has received a full rank of encoded data packets for this chunk of content (data) then at 240 the node determines if it has sent an ACK to its parent node before for this chunk of content (data). If the node has sent an ACK to its parent node before for this chunk of content (data) then processing returns to 220. If the node has not sent an ACK to its parent node before for this chunk of content (data) then at 245 the node sends (forwards, transmits) an ACK to its parent node for this chunk of content (data).

Figure 2C:
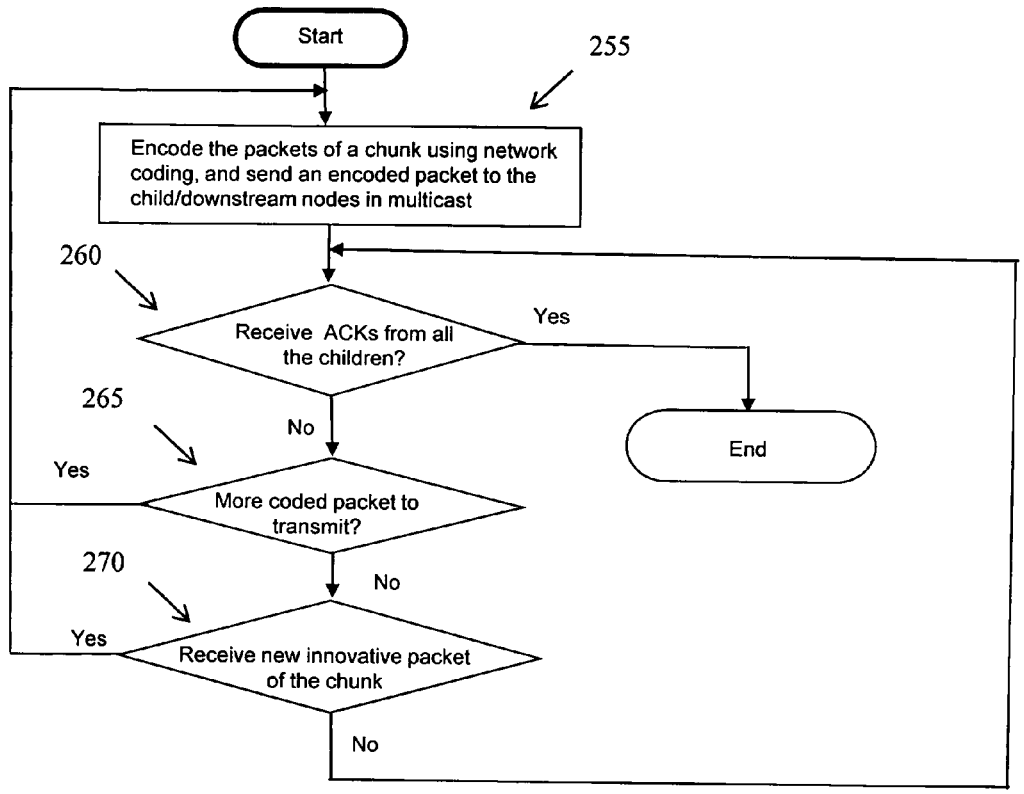
FIG. 2C is a flowchart for an exemplary transmitting method of a forwarding node of the hop-by-hop multicast in accordance with the principles of the present invention.

FIG. 2C is a flowchart for an exemplary transmitting method of a forwarding (intermediate) node of the hop-by-hop multicast in accordance with the principles of the present invention. At 255 the forwarding (intermediate) node encodes the data packets of a chunk of content (data) using network coding and sends (forwards, transmits) the encoded data packets to its child (downstream) nodes in multicast. At 260 the forwarding (intermediate) node determines if it has received ACKs from all of its child nodes (children) for the chunk of content (data). If the forwarding (intermediate) node has received ACKs from all of its child nodes (children) for the chunk of content (data) then processing ends. If the forwarding (intermediate) node has not received ACKs from all of its child nodes (children) for the chunk of content (data) then at 265 the forwarding (intermediate) node determines if it has more coded data packets to transmit for this chunk of content (data). If the forwarding (intermediate) node has more coded data packets to transmit for this chunk of content (data) then processing returns to 255. If the forwarding (intermediate) node has no more coded data packets to transmit for this chunk of content (data) then processing returns to 260.

Many routing protocols have been proposed and studied to establish and maintain multicast trees such as PIM, DVMRP, and multicast AODV. While, multicast routing protocol design is not a main focus of the present invention, HopCaster uses a join (leave) scheme inspired by PIM to build the source-based tree and enhance the scheme to support hop-by-hop cache-and-forward transport. It is assumed that an existing unicast routing protocol has been or can be used to construct unicast paths in the network between the source and the destinations (receivers), and the source (server) address is known by the destinations (receivers, joining node). A node joining the multicast group (tree) sends a join message to its parent (ancestor, predecessor, precursor) on the return path to the source. The join message contains the chunk acknowledgement table to indicate which chunks have been successfully received by the sending node. The join message travels and is processed hop-by-hop along the path toward the source. If the parent node has cached the chunks needed by the children, the needed chunks can be sent from this parent node to save bandwidth and reduce delay. The parent node updates the chunk acknowledgement table in the join message before it sends the join message to its parent. If an intermediate node can serve all the chunks needed by its children, it does not have to forward the join message upstream to its parent node. The nodes maintain soft state regarding what join messages they have received and sent. The state is discarded after a timeout. A node periodically sends join messages to its parent node to refresh the state. For bandwidth efficiency, periodic join messages can be combined with chunk acknowledgement (ACK) messages if possible.

When changes in network topology or link breaks are detected, the path between the destination (receiver, the multicast group member) and the source is repaired or reconstructed by the underlying unicast routing protocol. To speed up the recovery process, the affected nodes are informed of the events of link breaks and routing changes. If a node loses a child node due to routing change, it removes the state for this child. If a node changes its parent node towards the source, the node sends a join request message to its new parent node (ancestor, predecessor, precursor) on the reconstructed return path toward the source. The join message contains the information to indicate the progress of file delivery to it, i.e. which chunks it has successfully received.

Figure 3A:
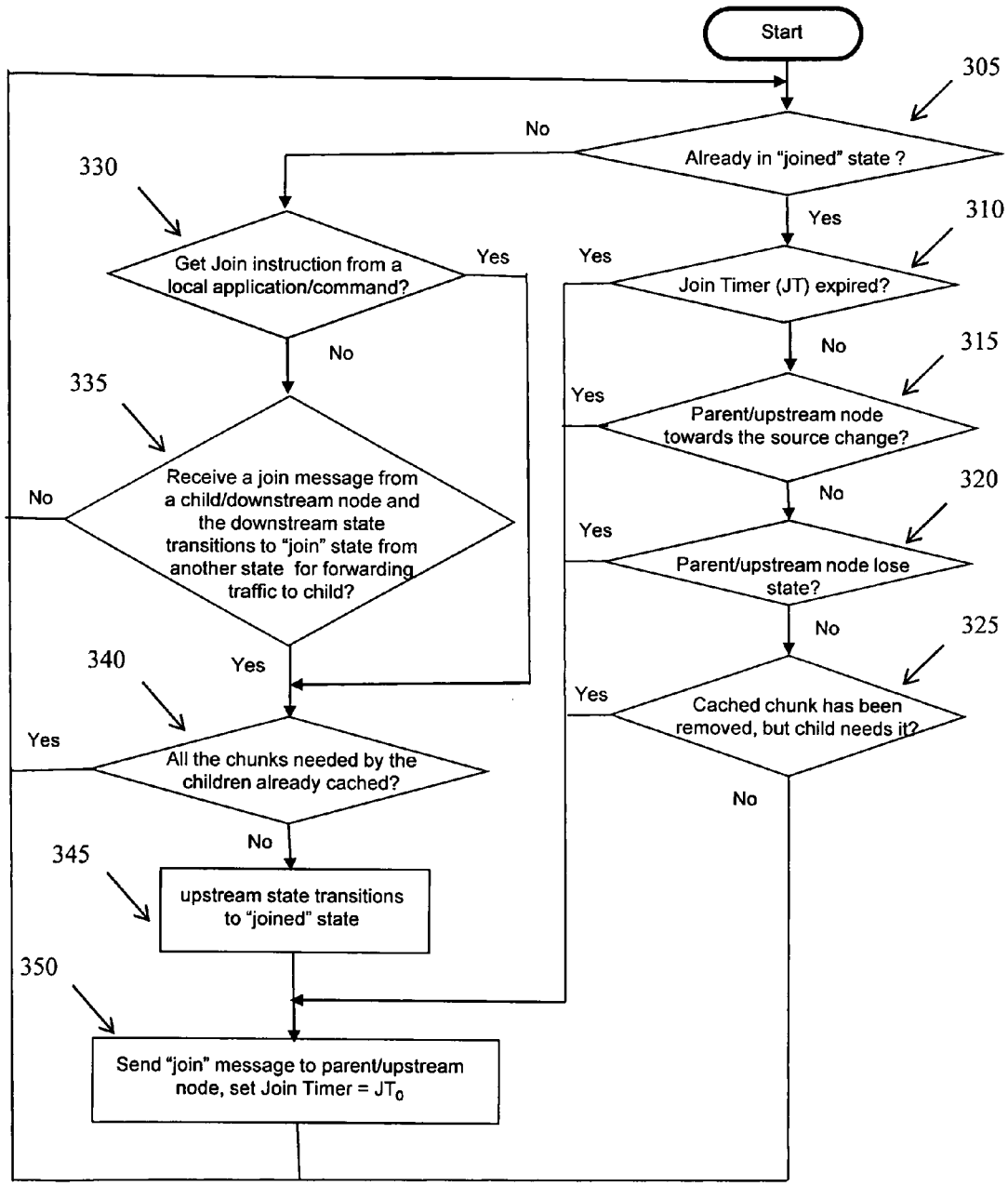
FIG. 3A is a flowchart of an exemplary method that a node (a receiver, group member or a forwarding node) joining a multicast tree and maintaining a multicast tree in accordance with the principles of the present invention.

FIG. 3A is a flowchart of an exemplary method that a node (a receiver, a destination, a group member or a forwarding node) joining a multicast tree and maintaining a multicast tree in accordance with the principles of the present invention. At 305, the node performs a test to determine its current state, specifically if the node is already in the "joined" state. If the node is already in the "joined" state then at 310, the node tests its join timer to determine if it has expired. If its join timer has not expired then at 315, the node performs a test to determine if the parent (ancestor, upstream) node towards the source has changed. If the parent (ancestor, upstream) node towards the source has not changed then at 320 the node performs a test to determine if the parent (ancestor, upstream) node has lost its state (the parent node may be crashed and then rebooted, or for other reasons, all its states are lost). If the parent (ancestor, upstream) node has not lost its state then at 325 the node performs a test to determine if the cached chunk of content (data) has been removed from memory (storage) and if a child node still needs it? If the cached chunk of content (data) has not been removed from memory (storage) or if no child node needs it then processing proceeds to 305. If the cached chunk of content (data) has been removed from memory (storage) and a child node still needs it then at 350 a join message is sent to the parent (ancestor, upstream) node and the join timer is set. Processing then proceeds to 305. If the parent (ancestor, upstream) node has lost its state then processing proceeds to 350. If the parent (ancestor, upstream) node towards the source has changed then processing proceeds to 350. If the node's join timer has expired then processing proceeds to 350.

If the node is not already in the "joined" state, then at 330 a test is performed to determine if the node has received join instructions from a local application or command. If the node has not received join instructions from a local application or command then at 335 a test is performed to determine if the node has received a join message from a child (downstream) node and the downstream state transitions to a "join" state from any other state for forwarding content (traffic, data) to the child (downstream) node. If the node has not received a join message from a child (downstream) node or the downstream state has not transitioned to a "join" state from any other state for forwarding content (traffic, data) to the child (downstream) node then processing proceeds to 305. If the node has received a join message from a child (downstream) node and the downstream state transitioned to a "join" state from any other state for forwarding content (traffic, data) to the child (downstream) node then at 340 a test is performed to determine if all of the chunks of content (data) needed by the child nodes (children) are already cached. If all of the chunks of content (data) needed by the child nodes (children) are already cached the processing proceeds to 305. If all of the chunks of content (data) needed by the child nodes (children) are not already cached then at 345 the node's upstream state is changed (transitions) to "joined". Processing proceeds to 350 described above. If the node has received join instructions from a local application or command then processing proceeds to 340.

Figure 3B:
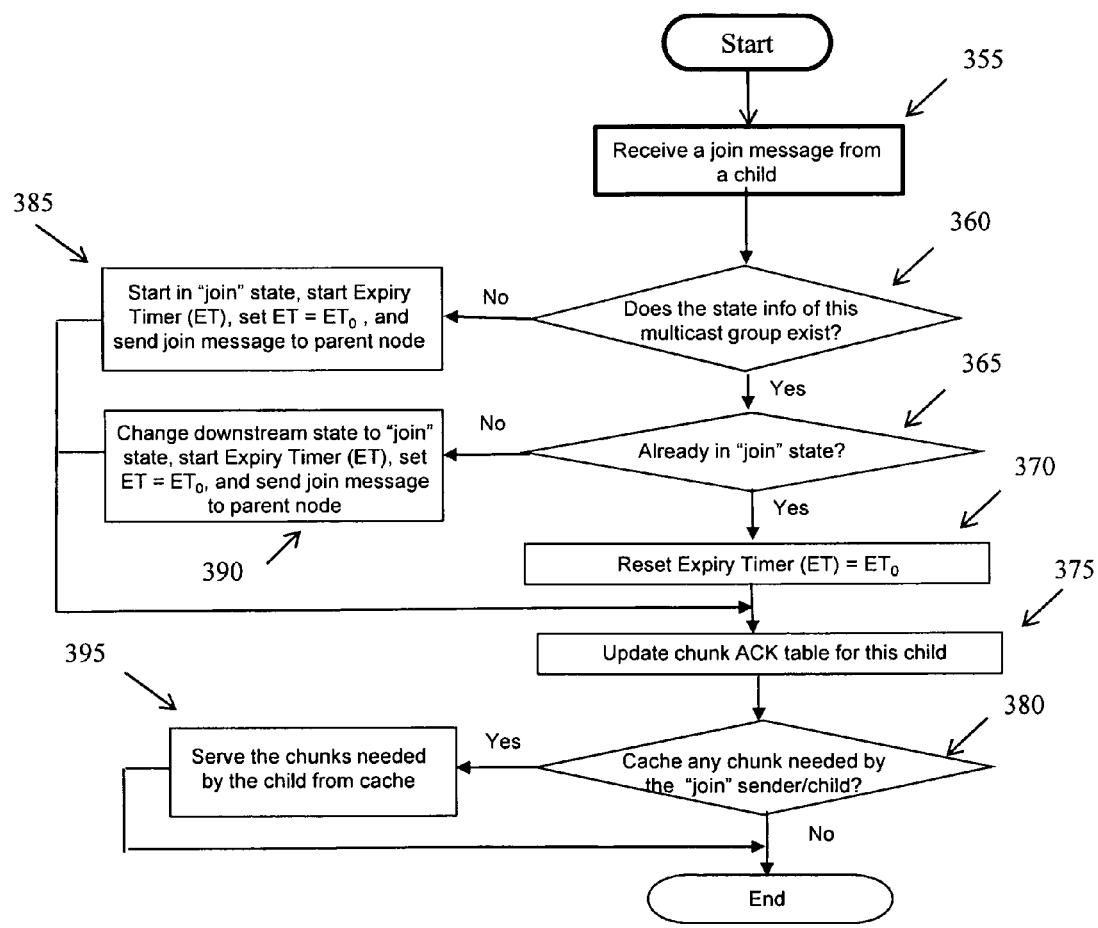
FIG. 3B is a flowchart of an exemplary method for a node to process a received join message in accordance with the principles of the present invention.

FIG. 3B is a flowchart of an exemplary method for a node to process a received join message in accordance with the principles of the present invention. At 355 a node receives a "join" message from a prospective child node. A test is performed at 360 to determine if state information exists for the multicast group (tree) which the prospective child node wishes to join. If state information exists for the multicast group (tree) which the prospective child node wishes to join then at 365 a test is performed to determine if the node processing the received "join" message is already in the "join" state. If the node processing the received "join" message is already in the "join" state then at 370 the expiration timer is reset. At 375 the node updates the chunk acknowledgement table for this child node. At 380 a test is performed to determine if any of the chunks of content (data) needed by the child issuing the "join" message are cached. If none of the chunks of content (data) needed by the child issuing the "join" message are cached then processing ends. If any of the chunks of content (data) need by the child issuing the "join" message are cached then at 395 the chunks of content (data) needed by the child issuing the "join" message that are cached are served by the node. Processing then ends.

If the node processing the received "join" message is not already in the "join" state then at 390 the node changes the state information for the child (downstream) node to "join" and sets and starts the expiration timer and sends a "join" message to its parent (ancestor, upstream) node. Processing then proceeds to 375. If state information does not exist for the multicast group (tree) which the prospective child node wishes to join then at 385 the state information is set to "join" and the expiration timer is set and started and a "join" message is sent to its parent (ancestor, upstream) node. Processing then proceeds to 375.

A receiver (node) leaves (exits) the multicast tree (group) by sending a leave message to its parent (ancestor, predecessor, precursor) node on the path toward the source. If the reception of a leave message causes the parent node now to have no remaining children, i.e. the parent node receives the leave message from its last child node, the parent node then sends a leave message to its parent (ancestor, predecessor, precursor) node. In addition, an intermediate (forwarding) node maintains soft state regarding what join messages the intermediate (forwarding) node has received from its children. The state is discarded (removed) after a timeout. If the soft states for all its children expire, the forwarding node leaves the multicast tree.

Figure 3C:
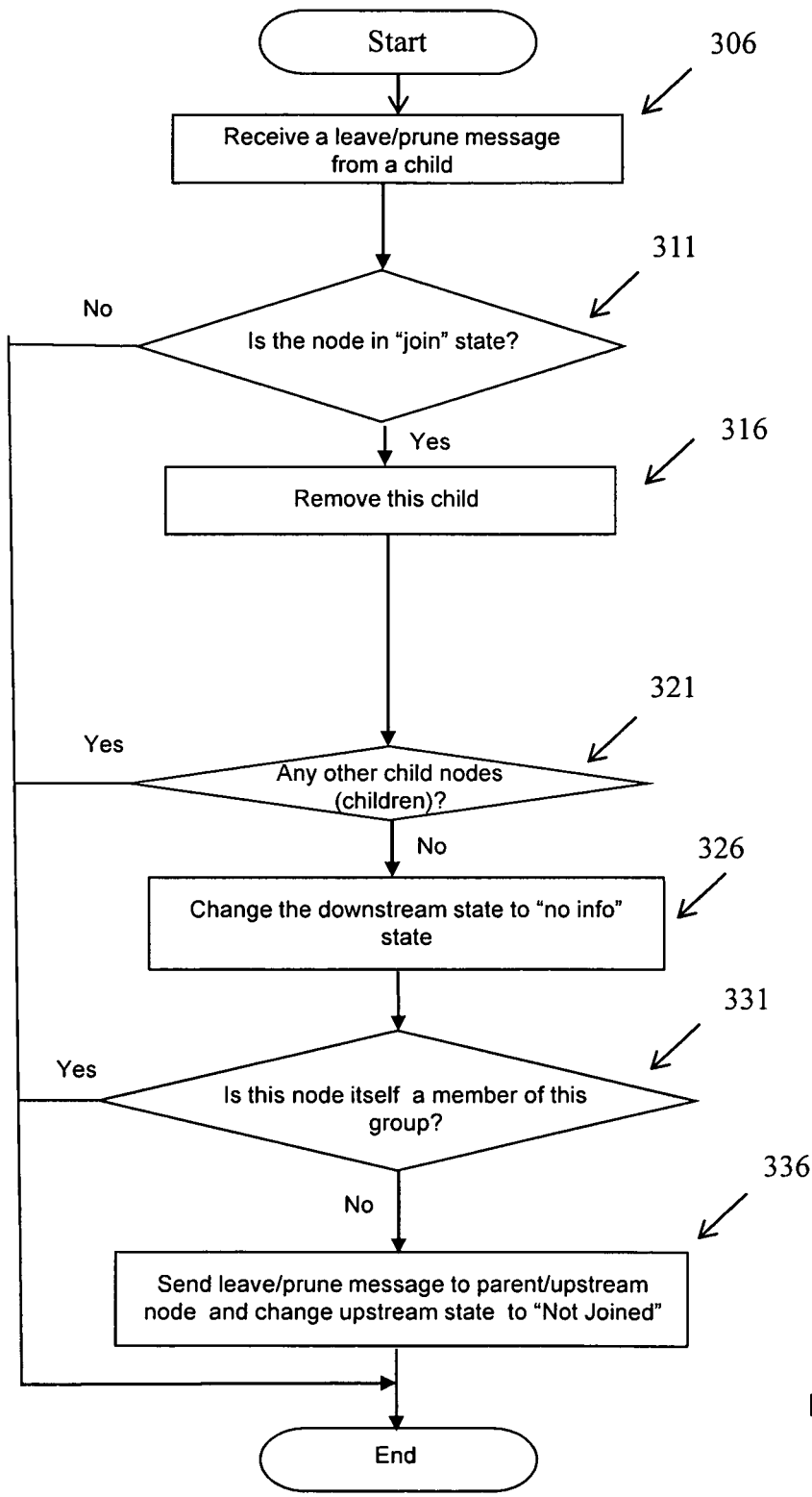
FIG. 3C is a flowchart of an exemplary method for a node to process a received leave (prune, exit) message in accordance with the principles of the present invention.

FIG. 3C is a flowchart of an exemplary method for a node to process a received leave (prune, exit) message in accordance with the principles of the present invention. At 306 the node receives a leave (exit, prune) message from a child node. At 311 a test is performed to determine if the child node's state in the state information is in the "join" state. If the child node's state in the state information is in the "join" state then remove this child and its state from the state information at 316. If the child node's state in the state information is not in the "join" state then processing ends. At 321 a test is performed to determine if the node has any other child nodes (children) for the multicast tree for which the child had joined. If the node has no other child nodes (children) for the multicast tree. then at 326 the node changes the downstream state to "no information". At 331 a test is performed to determine if the node itself is a member or a receiver (destination) of the multicast group (tree) for which it received an exit (leave, prune) message from one of its child nodes (children). If the node itself is a member or a receiver (destination) of the multicast group (tree) for which it received an exit (leave, prune) message from one of its child nodes (children) then processing ends. If the node itself is not a member or a receiver (destination) of the multicast group (tree) for which it received an exit (leave, prune) message from one of its child nodes (children) then at 336 the node sends a leave (prune, exit) message to its parent (ancestor, upstream) node and changes its upstream state to "not joined". Processing then ends. If the node has any other child nodes (children) for the multicast tree. then processing ends.

Figure 3D:
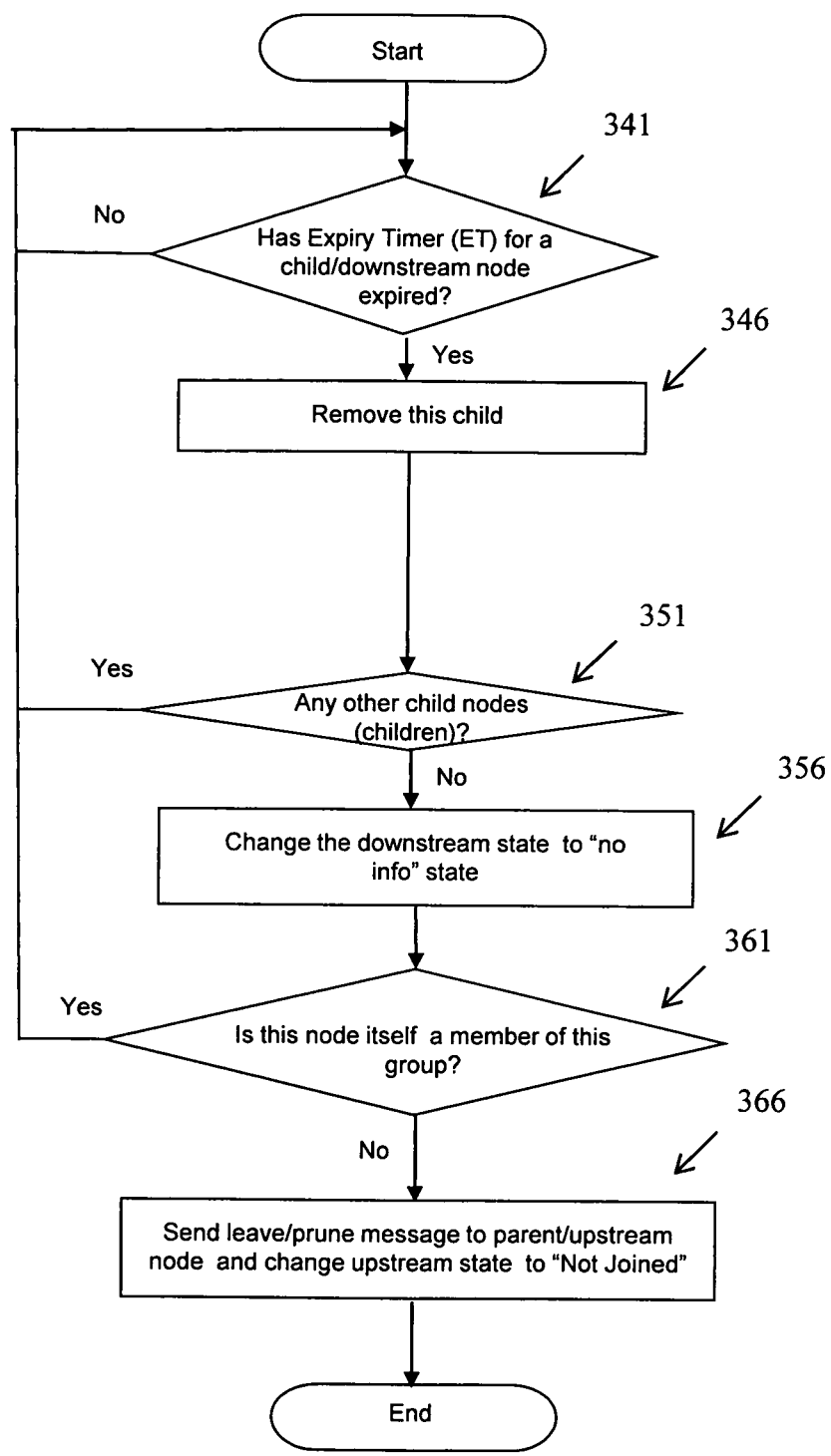
FIG. 3D is a flowchart of an exemplary method when an Expiry Timer (ET) expires in accordance with the principles of the present invention.

FIG. 3D is a flowchart of an exemplary method when an Expiry (Expiration) Timer (ET) expires in accordance with the principles of the present invention. At 341 a test is performed to determine if the expiry (expiration) timer for a child (downstream) node has expired. If the expiry (expiration) timer for a child (downstream) node has not expired then processing proceeds to 341. If the expiry (expiration) timer for a child (downstream) node has expired then at 346 the child and its state are removed from the state information. At 351 a test is performed to determine if the node has any other child nodes (children) for this multicast tree If the node has no other child nodes (children) for this multicast tree then at 356 the node changes the downstream state to "no information". At 361 a test is performed to determine if the node itself is a member or a receiver (destination) of the multicast group (tree). If the node itself is a member or a receiver (destination) of the multicast group (tree) then processing proceeds to 341. If the node itself is not a member or a receiver (destination) of the multicast group (tree) then at 366 the node sends a leave (prune, exit) message to its parent (ancestor, upstream) node and changes its upstream state to "not joined". Processing then ends. If the node has any other child nodes (children) for the multicast tree, then processing proceeds to 341.

Figure 3E:
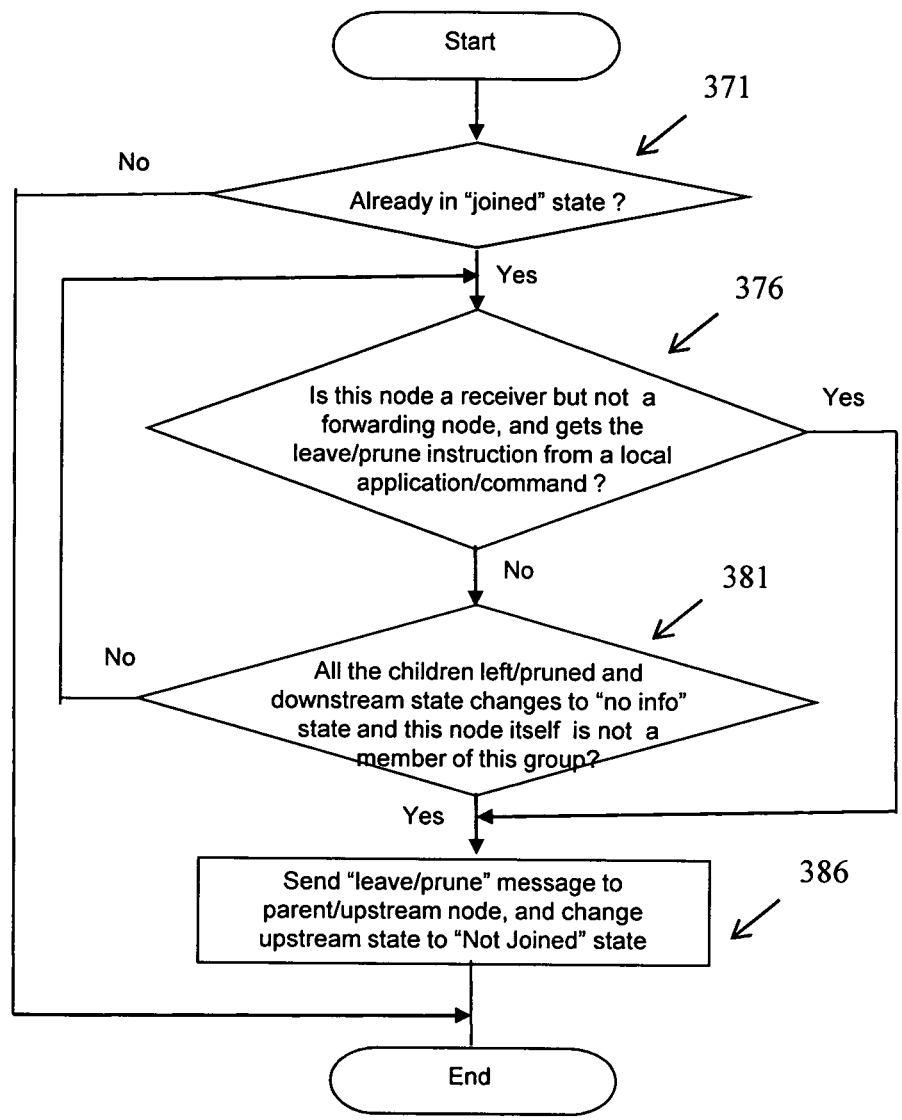
FIG. 3E is a flowchart of an exemplary method for a node (a receiver, group member or a forwarding node) leaving (pruning, exiting) a multicast tree in accordance with the principles of the present invention.

FIG. 3E is a flowchart of an exemplary method for a node (a receiver, a destination, group member or a forwarding node) leaving (pruning, exiting) a multicast tree in accordance with the principles of the present invention. At 371 the node performs a test to determine if the node is already in the "joined" state. If the node is not already in the "joined" state then processing ends. If the node is already in the "joined" state then at 376 a test is performed to determine if the node is a receiver (destination) but not a forwarding (intermediate) node and if the node received leave (exit, prune) instructions from a local application or command. If the node is not a receiver but is a forwarding (intermediate) node or if the node is a receiver and a forwarding node, or if the node does not receive leave (exit, prune) instructions from a local application or command then at 381 a test is performed to determine if all of the child (downstream) nodes (children) have left (exited, been pruned) and the downstream state changes (transitions) to "no information" and this node is itself not a member or a receiver (destination) of the multicast group (tree). If all of the child (downstream) nodes (children) have not left (exited, been pruned) or the downstream state has not changed (transitioned) to "no information" or this node is itself a member or a receiver (destination) of the multicast group (tree) then processing proceeds to 376. If all of the child (downstream) nodes (children) have left (exited, been pruned) and the downstream state changes (transitions) to "no information" and this node is itself not a member of the multicast group (tree) then at 386 the node sends a leave (exit, prune) message to its parent (ancestor, upstream) node and changes its upstream state to "not joined". Processing then ends.

Existing radios such as IEEE 802.11 support multi-rate transmission that allows data transmission to be adapted to varying channel conditions using different channel coding and modulation modes at the physical (PHY) layer. Link adaption for unicast has been widely studied. However, link adaptation for multicast in wireless mesh networks has received little attention. Along the multicast tree, the source node or a forwarding (intermediate) node (FN) may have multiple children. A multicast link adaptation method for local transmission optimization is now described, in which a node determines the most appropriate PHY mode for data transmission to its child nodes in order to achieve the maximum throughput.

Given a radio technology and physical layer mode, the data packet loss rate can be estimated from channel SNR γ. As an example, in IEEE 802.11a with a PHY mode m, where m=1, 2, ..., 8 for 6, 9, ..., and 54 Mbps data rates, respectively, as shown in FIG. 4, the data packet loss probability (rate) can be calculated by, $$P_e(l,\gamma,m) = 1 - [1 - P_e^1(24,\gamma)] \times [1 - P_e^m(246+l,\gamma)] \quad (3)$$

where l is the size of data payload. $P_e^1(24, \gamma)$ is the error probability of the physical layer convergence procedure (PLCP) sublayer header that is 24-bits long and is always transmitted with PHY mode 1, i.e. BPSK modulation and rate-1/2 convolutional code. $P_e^m(246+l, \gamma)$ is the error probability for the l-byte data payload plus the MAC header transmitted with PHY mode m. Note that in the IEEE 802.11 MAC, there is no packet level acknowledgement for multicast data packets (frames) at the link layer. Since in multicast design of the present invention, network coding is applied to original data packets, packet level acknowledgement is not necessary.

From Equation (3), the packet error probability depends on the physical layer transmission mode (i.e. data rate), the data payload (packet) size, and channel SNR. The PHY mode can be adjusted by the transmitter (sending, transmitting) node. Different multicast receiving nodes (connections) have different channel SNR values. Given the received channel SNR $\gamma_t$ for a receiving node t, the $P_e^t(l, \gamma_t, m)$ can be derived for each PHY mode m based on the modulation and channel coding scheme used in the PHY mode. Suppose a multicast sending node (transmitter) N has T child (receiving) nodes, the objective is to find the best PHY mode for the multicast sending node (transmitter) N to achieve the overall maximum throughput among all its T receiving nodes. The objective function can be formulated as $$\max \sum_{t=1}^{T} r(m)(1 - P_e^t(l, \gamma_t, m)) \quad (4)$$

where r(m) is the multicast data rate for the PHY mode m used by the transmitter (sending, transmitting) node.

In the multicast link adaptation method of the present invention, each child node measures its received channel SNR from its parent node periodically and feeds the channel SNR measurement back to its parent node. This feedback can be combined with other control information such as routing protocol control messages to reduce overhead. The parent node N chooses one of the PHY modes for multicasting to obtain the maximum total throughput among its targeted child (receiving) nodes based on the channel SNR feedbacks from its children and objective function (4).

In the above version of HopCaster, a source or a FN keeps transmitting data packets from the same chunk until all the children (child nodes) acknowledge successful reception of this chunk. That is, a node waits for ACKs from all children to arrive and then switches to the next chunk. Hop-by-hop store-and-forward transport in HopCaster naturally mitigates the "crying baby" problem by limiting it within one hop, instead of end-to-end as in Pacifier. However, if one child node has a particularly bad wireless connection, the child will slow down the completion time of other well-connected children for the prospective chunks, i.e. the "crying baby" problem may still occur. In order to solve the "crying babies" problem, HopCaster uses the following protocols (methods, schemes). The methods described below can be used either singly or in combination with each other.

One method is multicast link rate adaptation to the targeted children receiving the data packet to be transmitted. In HopCaster, hop-by-hop store-and-forward transport is used. A child sends an acknowledgement to its parent N after it successfully receives the full rank of the current chunk of content (data). Once the parent node N receives an ACK, which indicates one of its children has completed reception of the current chunk of content (data), parent node N readjusts its multicast PHY transmission mode (rate) to obtain the maximum total throughput based on the new topology of children that have not completed reception of the current chunk of content (data). After all the children acknowledge the successful reception of the chunk of content (data), the parent completes the transmission for this chunk of content (data) and moves to the next chunk of content (data). Link rate adaptation to the child(ren) topology optimizes the local multicast transmission and assures every child node receives the current chunk of content (data) without keeping other children waiting too long.

Figure 5:
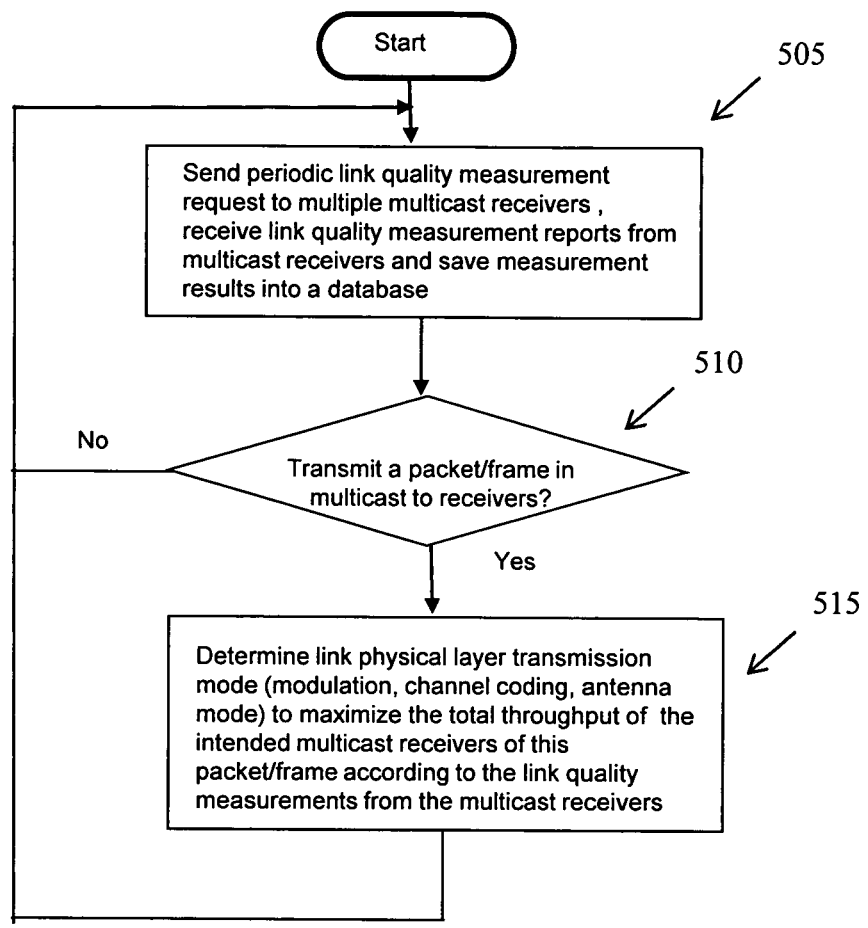
FIG. 5 is a flowchart of an exemplary link rate adaptation method for local multicast throughput optimization in accordance with the principles of the present invention.

FIG. 5 is a flowchart of an exemplary link rate adaptation method for local multicast throughput optimization in accordance with the principles of the present invention. At 505 a node sends periodic link quality measurement request to multiple multicast receivers and the node correspondingly periodically receives link quality measurement reports from the multicast receivers (its child (downstream) nodes) and saves the channel SNR measurement results in a database (storage, memory). At 510 a test is performed to determine if the node has a packet (frame) to multicast to receivers. If the node does not have a packet (frame) to multicast to receivers then processing proceeds to 505. If the node has a packet (frame) to multicast to receivers then at 515 the node determines the link physical layer transmission mode (modulation, channel coding, antenna mode) to maximize the total throughput of the intended multicast receivers of this packet (frame) according to the link quality measurements (previously received and stored in a database) from the multicast receivers. Processing then proceeds to 505.

A second method to solve the "crying babies" problem is packet level round-robin. This method is used among different chunks of data. In the packet level round-robin method of the present invention, the source or a FN sends the linear coded data packets from a list of chunks of content (data) in a round-robin fashion. Take node N, which can be a FN or the source, as an example. In addition to a chunk acknowledgement table, node N maintains a round-robin list which contains the chunk IDs node N is transmitting to its children. This list is empty at the startup. Node N first adds chunk 1 to the round-robin list and keeps sending the coded data packets of chunk 1 to its child nodes. If node N has received an ACK for chunk 1 from one of its child nodes and has already received chunk 2, it adds chunk 2 to the round-robin list. Node N sends a coded data packet from chunk 1 followed by one coded data packet from chunk 2. In this way, node N provides opportunities for the child nodes with poor connections to continuously receive the data packets of chunk 1, while preventing the child nodes with good links from waiting for the data packets of chunk 2. If node N collects ACKs from all child nodes for chunk 1, it removes chunk 1 from the round-robin list and stops sending additional coded data packets of chunk 1. Algorithm 1 in FIG. 6 is pseudo-code of an exemplary method for updating the chunk acknowledgement table and round-robin list at node N.

The above method yields an equal probability (weight) of sending a data packet from the round-robin list. The method can be improved by assigning the probability (weight) of sending data packets from each chunk in the round-robin list according to the number of missing ACKs for that chunk. For example, if node N has T number of children and node N has already received T−2ACKs for chunk 1, while it has only received one ACK for chunk 2, then node N sends 2 packets from the first chunk and T−2 packets from the second chunk followed by each other. This method further allows the child nodes with good connections to quickly obtain the necessary number of data packets to decode more chunks of content (data).

A third method to solve the "crying babies" problem is inter-chunk network coding. Inter-chunk network coding only occurs at the source node or a FN if the connections vary among its child nodes. Taking node N as an example. Node N maintains a chunk acknowledgement table and a mixture list, which has exactly same content as the round-robin list described above. A different name is used for the list to differentiate the two methods. The same algorithm (see FIG. 6) is used to update the chunk acknowledgement table and the mixture list.

For the same scenario, if node N receives the first ACK message for chunk 1, which comes from the child node with the best connection, instead of moving to the next chunk of content (data) immediately, node N continues sending a few more coded data packets of chunk 1, during which, more ACKs may come in. If after that, node N still fails to collect ACKs for chunk 1 from all of its child nodes, node N sends the linear combinations of both chunk 1 coded data packets and chunk 2 coded data packets, i.e. the packets inter-chunk coded with both the first and second chunks of content (data). For those nodes which have successfully received chunk 1, they only need $B_2$ innovative data packets to decode chunk 2. Therefore, the child nodes with good connections are able to quickly get more chunks of content (data).

In the above inter-chunk network coding method, node N keeps sending (transmitting, forwarding) a few more coded data packets of the current chunk of content (data) to wait for more ACKs to arrive. The reason is if node N moves to the next chunk of content (data) immediately after the first ACK reaches node N, then the following data packets will be the combinations of both the first and second chunks of content (data), the nodes that have not completed reception of the first chunk of content (data) need more innovative data packets to decode both chunks of content (data) simultaneously, which delays the completion of the first chunk of content (data). By continuing to send the linear combinations of the current chunk of content (data), more child nodes are able to receive enough innovative data packets of the current chunk of content (data), although their connections might be a little worse than the best connection. After that, those child nodes which still fail to return the ACK message are proved to have very bad connections with node N. The nodes with very bad connections will eventually receive enough inter-chunk coded data packets to decode multiple chunks although it may take a long time.

The methods proposed above to solve the "crying baby" problem can be used singly or jointly (in combination). For example, link rate adaptation can be used with packet level round-robin. When a node transmits the coded data packets of a chunk of content (data), it adapts its multicast link rate to maximize the total throughput for all the targeted (intended) children receiving this chunk of content (data). Similarly, when a node transmits the packets of any subsequent chunks of content (data), the multicast link rate is adapted to maximize the total throughput for all the targeted (intended) children receiving the subsequent chunks of content (data). In another example, inter-chunk network coding, packet level round-robin, and link rate adaptation can be used jointly. A node transmits the coded data packets from the first chunk of content (data) and then the inter-chunk coded data packets from chunks 1 and 2 in a round-robin manner. When a node transmits a coded data packet, it adapts its multicast link rate to optimize the total throughput for all the targeted (intended) children receiving this packet.

Each forwarding node caches the received innovative data packets or chunks of content (data). Caching in the forwarding nodes can compensate for bandwidth fluctuation and reduces the impact of the "crying baby" problem due to network heterogeneity. However, congestion and buffer overflow at a FN may occur due to finite storage size, so congestion control is still needed. An explicit congestion control method to utilize the distributed caching capability of forwarding (intermediate) nodes in the network is described next. The explicit congestion control method is based on three main components: local congestion monitoring and congestion detection, congestion control signaling, and packet transmission (sending) rate control. Congestion control signaling is triggered after congestion is detected at a FN through local congestion monitoring. A FN monitors its buffer (storage) status. When a node (FN) detects its storage occupation (usage) over a high threshold $B_h$ and the incoming traffic is causing this congestion, the node transmits a Congestion Control Notification packet to the parent (predecessor, precursor, upstream) node of its incoming traffic. The Congestion Control Notification can be sent with high priority to ensure timely transmission of the congestion control signaling messages and to avoid transmission of stale messages that can reduce network efficiency. A node that receives a Congestion Control Notification can adjust its data packet transmission (sending) rate (defined by the number of transmitted data packets per a unit of time) to the sender of the Congestion Control Notification packet. Reduction of data packet transmission (sending) rate to a congested node avoids buffer overflow in the congested node and avoids wasting mesh resources for transmission of data packets especially since the data packets have a high probability of being discarded by the congested node. A congested node will transmit the Congestion Control Notification at an interval $T_x$ until its storage usage falls below a low threshold $B_l$. $B_h$, $B_l$, and $T_x$ are design parameters that are configurable.

Specifically when the source or a forwarding node on the multicast tree receives one or more Congestion Control Notifications from one or more its children during each duration $T_c$, it reduces its data packet transmission (sending) rate to the congested nodes to half of its current data packet transmission (sending) rate. Note that packet sending (transmission) rate is defined as the number of transmitted data packets per a unit of time. When a data packet is sent, the PHY rate used to transmit the data packet is the rate determined by the local optimization algorithm described above. The interval to send data packets becomes longer to reduce the packet sending (transmission) rate, that is, the node transmits a data packet and waits for a longer interval and then transmits next data packet. When congestion occurs, multiple nodes around the congestion area may send the Congestion Control Notifications. With the duration $T_c$, these Congestion Control Notifications are aggregated and treated as one notification by the source and the upstream FNs. For example, the duration $T_c$ can be configured as the possible maximum round trip delay in the network. The data packet transmission (sending) rate is then linearly or additively increased using an incremental step $D_c$ every time period $T_n$, for example, one data packet every network transversal time if node N has not received any congestion messages from its child nodes for a period of time $T_n$. Besides this exponential decrease, linear increase method. Other methods for increasing and decreasing the data packet sending (transmission) rate such a linear increase linear decrease, exponential increase exponential decrease can also be used. The packet rate adjustment algorithm at a node can be described as follows:

```
initialize congestion control timer T₁ = 0
initialize packet rate increment timer T₂ = Tₙ
initialize PacketRate = initial PacketRate
while (true) {
    If receive a Congestion Control Notification {
        if T₁ == 0 {
            PacketRate = max{⌊1/2 × PacketRate⌋, min PacketRate}
            T₁ = T_c
            T₂ = Tₙ
        } else {
            T₂ = Tₙ
        }
    }
    if T2 == 0 {
        PacketRate = min{⌊PacketRate + D_c⌋, max PacketRate}
        T2 = Tn
    }
}
(configure minPacketRate = 1, initial PacketRate = MaxPacketRate = the maximum rate that the node can send packet, D_c = 1)
``` where $T_c$, $T_n$ and $D_c$ are design parameters. The value of $T_n$ could be set equal to that of $T_c$ for simplicity and equal to the possible maximum round trip delay in the network. Alternatively, if node transversal time is $T_t$, the value of $T_c$ can be set to be equal to $2 \times T_t \times$ NetworkDiameter. NetworkDiameter is the maximum number of hops that the shortest path between any two nodes in the network transverses. In yet another alternative, $T_c$ can be set to be the time period the node N finishes the transmission of the current chunk of content (data). The value of $D_c$ can be set to be equal to 1 or max PacketRate/($M \times T_c$), where M can be set to be a heuristic value, for example 10. It means the packet rate will be increased to maxPacketRate after 10×Tc.

Figure 7:
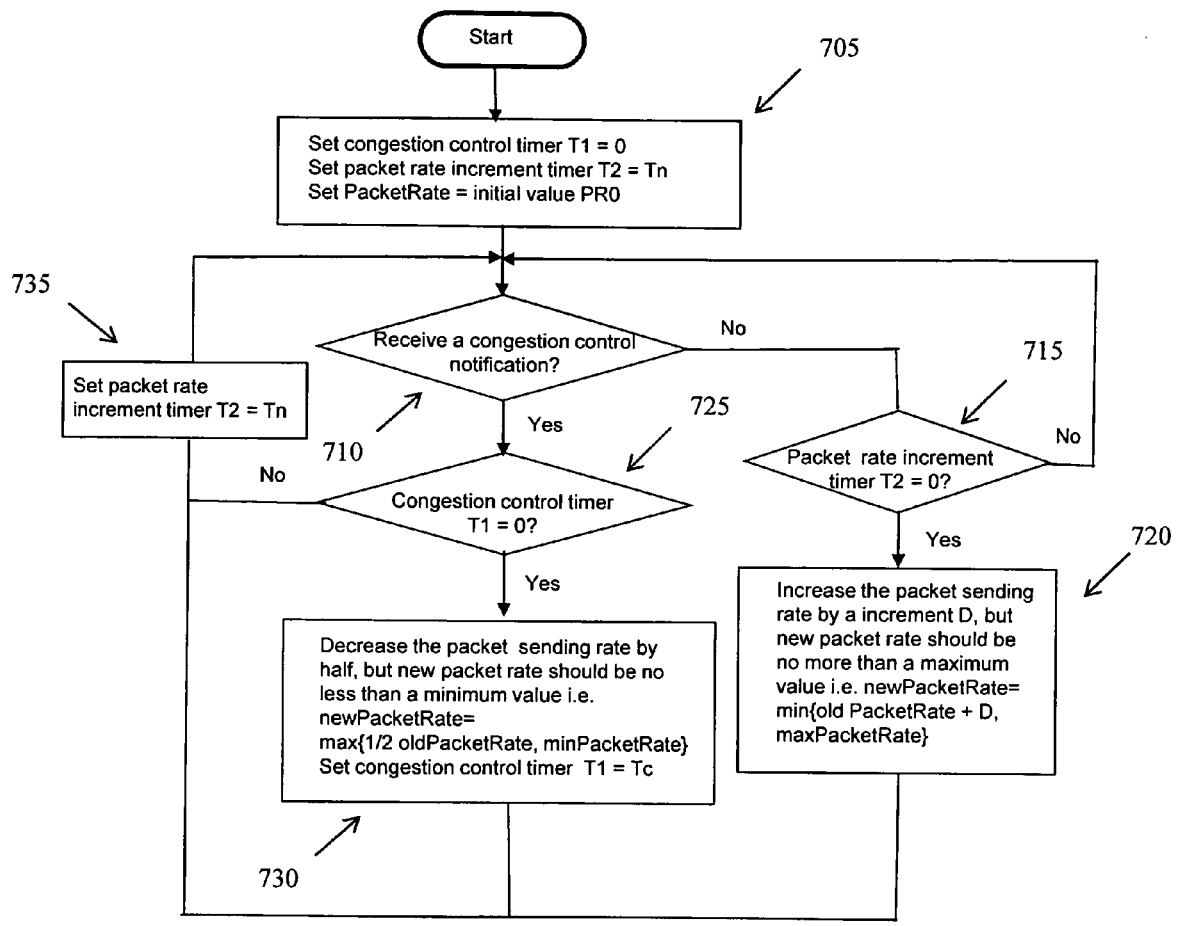
FIG. 7 shows a flowchart for an exemplary congestion control method in accordance with the principles of the present invention.

FIG. 7 is a flowchart for an exemplary congestion control method in accordance with the principles of the present invention. At 705 the node sets the congestion control timer T1=0, sets the packet rate increment timer T2=$T_n$ and sets PacketRate=initial value PRO (the initial packet sending (transmission) rate can be configured to be the maximum rate that the node can send the packets to its child nodes). At 710 a test is performed to determine if the node has received a Congestion Control Notification. If the node has not received a Congestion Control Notification then at 715 a test is performed to determine if the packet rate timer 72 is equal to 0. If the packet rate timer 72 is not equal to 0 then processing proceeds to 710. If the packet rate timer 72 is equal to 0 then at 720 the node increases the packet sending (transmission) rate by an increment D, but the new packet rate should be no more than a maximum value i.e. newPacketRate=min{old PacketRate+D, maxPacketRate}. At 735 the node then sets the packet rate increment timer T2 equal to $T_n$. Processing proceeds to 710. If the node has received a Congestion Control Notification then at 725 a test is performed to determine if the congestion control timer T1 is equal to 0. If the congestion control timer T1 is not equal to 0 then processing proceeds to 735. If the congestion control timer T1 is equal to 0 then at 730 the node decreases the packet sending (transmission) rate by half, but the new packet rate should be no less than a minimum value i.e. newPacketRate=max{½ oldPacketRate, minPacketRate}. The node also sets the congestion control timer T1 equal to $T_c$.

In an alternative embodiment, a separate multicast tree (group) can be established and maintained to distribute a chunk of content (data). That is, each chunk of content (data) can have its own multicast group (tree). A receiver joins multiple multicast groups (trees), one for each chunk of content (data). Multiple chunks of content (data) can be distributed from the source to the receivers in parallel.

The present invention can be implemented at the link (media access control) layer (layer 2) of the network protocol stack, or implemented at the network layer (Internet protocol—IP) layer (layer 3), or implemented above the network layer at the transport layer (layer 4) or as an application (layer 7).

Figure 8:
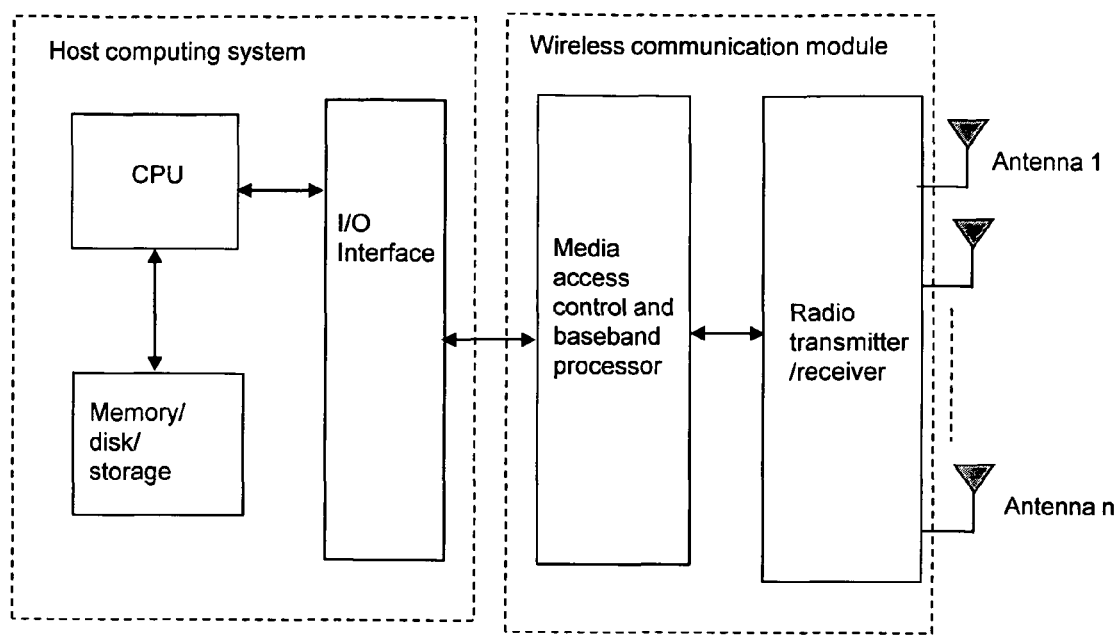
FIG. 8 is a block diagram of an exemplary implementation of the present invention.

Referring now to FIG. 8, which is a block diagram of an exemplary wireless device implementation of the present invention. That is, the device of FIG. 8 may be a source, a forwarding (intermediate) node or an end device with the differences being in the software loaded into the individual devices. The present invention includes a host computing system and a communication module (wired (not shown) or wireless). The host processing system can be a general-purpose computer or a specific-purpose computing system or a combination thereof. The host computing system can include a central processing unit (CPU), a memory, a storage unit (device), and an input/output (I/O) interface. The wireless communication module can include a MAC and baseband processor, radio transceiver (transmitter and/or receiver), and one or more antennas. An antenna transmits and receives the radio signals. The radio transceiver (transmitter and/or receiver) performs radio signal processing for transmission and/or reception. The MAC and baseband processor performs MAC control and data framing, modulation and/or demodulation, coding and/or decoding for the transmission and/or reception. At least one embodiment of the present invention can be implemented as a routine in the host computing system and/or the wireless communication module to process the transmission and receiving of data and control signal. That is, the block diagram of FIG. 8 may be implemented as hardware, software, firmware, a field programmable gate array (FPGA), an application specific integrated circuit (ASIC), a reduced instruction set computer (RISC) or any combination thereof. Further, the exemplary processes illustrated in the various flowcharts and text above are operationally implemented in either the host processing system or the wireless communication module or a combination of the host processing system and the communication module. That is, specifically, network coding, link rate adaptation, congestion control and adaptive scheduling (in accordance with the steps of the flowcharts of FIGS. 2A, 2B, 2C, 5, 6 and 7) of the hop-by-hop multicasting of the present invention are performed by the CPU of the host computing system. The actual transmission and receiving of data packets of the content or portion of the content is performed by the wireless communication module. Furthermore, similarly, the functions and steps of joining and leaving the hop-by-hop multicast network of the present invention (in accordance with the steps of the flowcharts of FIGS. 3A, 3B, 3C, 3D, and 3E) are performed by the CPU of the host computing system. The actual transmission and receiving of requests to join and/or leave (exit) are performed by the wireless communication module. The function of the expiration timer is performed in the CPU of the host computing system. The block diagram thus fully enables the various methods and/or processes to be practiced in hardware, software, firmware, a field programmable gate array (FPGA), an application specific integrated circuit (ASIC), a reduced instruction set computer (RISC) or any combination thereof.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method of transmitting by hop-by-hop multicasting with adaptive scheduling including network coding of data packets to downstream receivers comprising:
   encoding data packets of a portion of content using said network coding;
   identifying each of said downstream receivers in a table, wherein said table includes an entry corresponding to said encoded data packets and acknowledgement messages from each of said downstream receivers indicative of receipt of said encoded data packets;
   multicasting said encoded data packets to said downstream receivers;
   determining if an acknowledgement message, indicating successful reception of said encoded data packets, has been received from at least one of said downstream receivers on a hop-by-hop basis;
   upon determining said acknowledgement message is received from said at least one downstream receiver, updating said table to indicate receipt of the acknowledgement message;
   determining if acknowledgement messages, indicating successful reception of said encoded data packets, have been received from all of said downstream receivers responsive to said first determination, wherein any acknowledgement messages received from downstream receivers indicate successful reception of said encoded data packets including at least one of network coded data packets overheard from neighboring nodes and network coded data packets multicast by parent nodes; and
   resending said encoded data packets if either said first or said second determining acts are negative.

2. The method according to claim 1, further comprising building a multicast tree connecting a source to said downstream receivers, wherein said multicast tree is built using an expected transmission time function to determine shortest paths connecting said source to said downstream receivers, and further wherein said shortest path multicast tree is reconstructed whenever connectivity between said source and any of said downstream receivers changes.

3. The method according to claim 1, wherein said content is divided into multiple portions, each portion having multiple data packets, before encoding.

4. The method according to claim 1, wherein each of said encoded data packets includes an identifier corresponding to said portion and a coding vector of random coefficients used to generate each of said encoded data packets.

5. The method according to claim 1, wherein link rate adaptation is also performed in said hop-by-hop multicasting, wherein said link rate adaptation further comprises:
transmitting a periodic link quality measurement request to said downstream receivers;
receiving a link measurement report from said downstream receivers;
storing said link measurement report;
determining if there are additional data packets to be multicast to said downstream receivers; and
determining a link physical layer transmission mode responsive to said first determination and said link measurement report for said downstream receivers.

6. The method according to claim 1, wherein congestion control adaptation is also performed in said hop-by-hop multicasting, wherein said congestion control further comprises:
receiving a congestion control notification;
decreasing a transmission rate for said encoded data packets of said portion of said content by a factor, wherein said decreased transmission rate is greater than a minimum transmission rate;
increasing said transmission rate for said encoded data packets of said portion of said content by a factor, wherein said increased transmission rate is less than a maximum transmission rate if no further congestion control messages are received for a period of time.

7. The method according to claim 1, wherein said adaptive scheduling further comprises:
removing said entry from said table upon determining said acknowledge messages are received from all of said downstream receivers.

8. An apparatus, comprising:
means for performing hop-by-hop multicasting to downstream receivers with adaptive scheduling including means for network coding of data packets of a portion of content;
means for encoding data packets of a portion of content using said network coding;
means for identifying each of said downstream receivers in a table, wherein said table includes an entry corresponding to said encoded data packets and acknowledgement messages from each of said downstream receivers indicative of receipt of said encoded data packets;
means for multicasting said encoded data packets to downstream receivers;
means for determining if an acknowledgement message, indicating successful reception of said encoded data packets, has been received from at least one of said downstream receivers on a hop-by-hop basis;
means for updating said table to indicate receipt of the acknowledgement message, upon determining said acknowledgement message is received from said at least one downstream receiver;
means for determining if acknowledgement messages, indicating successful reception of said encoded data packets, have been received from all of said downstream receivers on said hop-by-hop basis responsive to said first determination, wherein any acknowledgement messages received from downstream receivers indicate successful reception of said encoded data packets including at least one of network coded data packets overheard from neighboring nodes and network coded data packets multicast by parent nodes; and
resending said encoded data packets if either said first or said second determining acts are negative.

9. The apparatus according to claim 8, further comprising means for building a multicast tree connecting a source to said downstream receivers, wherein said multicast tree is built using an expected transmission time function to determine shortest paths connecting said source to said downstream receivers, and further wherein said shortest path multicast tree is reconstructed whenever connectivity between said source and any of said downstream receivers changes.

10. The apparatus according to claim 8, wherein said content is divided into multiple portions, each portion having multiple data packets, before encoding.

11. The apparatus according to claim 8, wherein each of said encoded data packets includes an identifier corresponding to said portion and a coding vector of random coefficients used to generate each of said encoded data packets.

12. The apparatus according to claim 8, wherein said means for hop-by-hop multicasting also includes means for link rate adaptation, wherein said means for link rate adaptation further comprises:
means for transmitting a periodic link quality measurement request to said downstream receivers;
means for receiving a link measurement report from said downstream receivers;
means for storing said link measurement report;
means for determining if there are additional data packets to be multicast to said downstream receivers; and
means for determining a link physical layer transmission mode responsive to said first determination and said link measurement report for said downstream receivers.

13. The apparatus according to claim 8, wherein said means for hop-by-hop multicasting also includes means for congestion control, wherein said means for said congestion control further comprises:
means for receiving a congestion control notification;
means for decreasing a transmission rate for said encoded data packets of said portion of said content by a factor, wherein said decreased transmission rate is greater than a minimum transmission rate;
means for increasing said transmission rate for said encoded data packets of said portion of said content by a factor, wherein said increased transmission rate is less than a maximum transmission rate if no further congestion control messages are received for a period of time.

14. The apparatus according to claim 8, wherein said means for hop-by-hop multicasting with adaptive scheduling further comprises:
means for removing said entry from said table upon determining said acknowledge messages are received from all of said downstream receivers.

15. An apparatus, comprising:
a host computing system including a processing unit for network coding of data packets of a portion of content and performing adaptive scheduling, a storage unit and an interface, wherein said processing unit includes a table identifying each of said downstream receivers, said table including an entry corresponding to said encoded data packets and acknowledgement messages from each of said downstream receivers indicative of receipt of said encoded data packets; and
a communication module including a transmitter that performs hop-by-hop multicasting and a media access control processor, wherein said transmitter multicasts said network coded data packets to downstream receivers;

wherein the processing unit of the host computing system determines if an acknowledgement message, indicating successful reception of said encoded data packets, has been received from at least one of said downstream receivers on a hop-by-hop basis and if an acknowledgement message, indicating successful reception of said encoded data packets, have been received from all of said downstream receivers on said hop-by-hop basis responsive to said first determination, wherein any acknowledgement messages received from downstream receivers indicate successful reception of said encoded data packets including at least one of network coded data packets overheard from neighboring nodes and network coded data packets multicast by parent nodes;

said processing unit of the host computing system updating said table to indicate receipt of the acknowledgement message, upon determining said acknowledgement message is received from said at least one downstream receiver; and said transmitter of said communication unit resends said encoded data packets if either said first or said second determining acts are negative.

16. The apparatus according to claim 15, wherein the media access control processor builds a multicast tree connecting a source to said downstream receivers, wherein said multicast tree is built using an expected transmission time function to determine shortest paths connecting said source to said downstream receivers, and further wherein said shortest path multicast tree is reconstructed whenever connectivity between said source and any of said downstream receivers changes.

17. The apparatus according to claim 15, wherein said content is divided into multiple portions, each portion having multiple data packets, before encoding.

18. The apparatus according to claim 15, wherein each of said encoded data packets includes an identifier corresponding to said portion and a coding vector of random coefficients used to generate each of said encoded data packets.

19. The apparatus according to claim 15, wherein said processing unit of said host computing system performs link rate adaptation, said link rate adaptation including:
    transmitting a periodic link quality measurement request to said downstream receivers;
    receiving a link measurement report from said downstream receivers;
    storing said link measurement report;
    determining if there are additional data packets to be multicast to said downstream receivers; and
    determining a link physical layer transmission mode responsive to said first determination and said link measurement report for said downstream receivers.

20. The apparatus according to claim 15, wherein said processing unit of said host computing system performs congestion control, wherein said congestion control includes:
    receiving a congestion control notification;
    decreasing a transmission rate for said encoded data packets of said portion of said content by a factor, wherein said decreased transmission rate is greater than a minimum transmission rate; and
    increasing said transmission rate for said encoded data packets of said portion of said content by a factor, wherein said increased transmission rate is less than a maximum transmission rate if no further congestion control messages are received for a period of time.

21. The apparatus according to claim 15, wherein said processing unit of said host computing system performs adaptive scheduling, wherein said adaptive scheduling includes:
    removing said entry from said table upon determining acknowledge messages are received from all of said downstream receivers.

* * * * *